US011164039B2

(12) United States Patent
Gan et al.

(10) Patent No.: US 11,164,039 B2
(45) Date of Patent: Nov. 2, 2021

(54) FRAMEWORK FOR FEW-SHOT TEMPORAL ACTION LOCALIZATION

(71) Applicant: International Business Machines Corporation, Armonk, NY (US)

(72) Inventors: Chuang Gan, Cambridge, MA (US); Ming Tan, Malden, MA (US); Yang Zhang, Cambridge, MA (US); Dakuo Wang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 16/661,501

(22) Filed: Oct. 23, 2019

(65) Prior Publication Data
US 2021/0124987 A1 Apr. 29, 2021

(51) Int. Cl.
*G06K 9/62* (2006.01)
*G06K 9/46* (2006.01)
*G06N 3/08* (2006.01)

(52) U.S. Cl.
CPC ............ *G06K 9/6224* (2013.01); *G06K 9/46* (2013.01); *G06K 9/6212* (2013.01);
(Continued)

(58) Field of Classification Search
CPC ................... G06K 9/46; G06K 9/6267; G06T 2207/10016; G06T 7/11
See application file for complete search history.

(56) References Cited

U.S. PATENT DOCUMENTS 6,072,542 A * 6/2000 Wilcox .............. G06K 9/00711
348/700
7,469,056 B2 * 12/2008 Ramm ................ G01N 15/1475
382/128
(Continued)

FOREIGN PATENT DOCUMENTS

CN 109255791 A 1/2019
CN 109492691 A 3/2019
(Continued)

OTHER PUBLICATIONS

Yang et al., "One-shot Action Localization by Learning Sequence Matching Network," The IEEE Conference on Computer Vision and Pattern Recognition (CVPR), 10 pages, Jun. 2018.
(Continued)

*Primary Examiner* — Yosef Kassa
(74) *Attorney, Agent, or Firm* — Amin, Turocy & Watson, LLP

(57) ABSTRACT

Systems and techniques that facilitate few-shot temporal action localization based on graph convolutional networks are provided. In one or more embodiments, a graph component can generate a graph that models a support set of temporal action classifications. Nodes of the graph can correspond to respective temporal action classifications in the support set. Edges of the graph can correspond to similarities between the respective temporal action classifications. In various embodiments, a convolution component can perform a convolution on the graph, such that the nodes of the graph output respective matching scores indicating levels of match between the respective temporal action classifications and an action to be classified. In various embodiments, an instantiation component can input into the nodes respective input vectors based on a proposed feature vector representing the action to be classified. In various cases, the respective temporal action classifications can
(Continued)

correspond to respective example feature vectors, and the respective input vectors can be concatenations of the respective example feature vectors and the proposed feature vector.

20 Claims, 16 Drawing Sheets

(52) U.S. Cl.
CPC ............. *G06K 9/6276* (2013.01); *G06N 3/08* (2013.01); *G06K 2009/4695* (2013.01)

(56) References Cited

U.S. PATENT DOCUMENTS

| | | | | |
|---|---|---|---|---|
| 7,764,822 | B2* | 7/2010 | Ramm | G01N 21/6428 |
| | | | | 382/133 |
| 7,844,127 | B2* | 11/2010 | Adams, Jr. | G06T 3/4015 |
| | | | | 382/266 |
| 8,166,522 | B2* | 4/2012 | Martin | G06F 16/972 |
| | | | | 726/4 |
| 8,516,266 | B2* | 8/2013 | Hoffberg | G05B 19/042 |
| | | | | 713/189 |
| 8,705,806 | B2* | 4/2014 | Nakano | G06K 9/00926 |
| | | | | 382/115 |
| 8,984,622 | B1* | 3/2015 | Baldwin | G06K 9/00234 |
| | | | | 726/16 |
| 9,137,548 | B2* | 9/2015 | Li | H04N 19/115 |
| 9,406,131 | B2* | 8/2016 | Wurmlin | G06T 7/85 |
| 9,508,151 | B2* | 11/2016 | Romanik | G06K 9/00 |
| 9,552,520 | B1 | 1/2017 | Smolic et al. | |
| 2018/0173955 | A1 | 6/2018 | Mehrseresht | |
| 2019/0034787 | A1 | 1/2019 | Knittel | |

FOREIGN PATENT DOCUMENTS

| | | |
|---|---|---|
| CN | 109918542 A | 6/2019 |
| CN | 109977223 A | 7/2019 |
| CN | 110197207 A | 9/2019 |
| CN | 110263227 A | 9/2019 |
| CN | 110362715 A | 10/2019 |

OTHER PUBLICATIONS

International Search report and written opinion received for PCT apllication PCT/IB2020/059630 dated Jan. 27, 2021, 11 pages.

Aliyun yunqi hao Introduction of Graph Neural Network (GNN) https://mbd.baidu.com/newspage/data/landingshare?pageType=1&isBdboxFrom=1&context=%7B%22nid%22%3A%22news_10038044053670350140%22%7D Mar. 22, 2019(Mar. 22, 2019) pp. 1-5.

* cited by examiner

| COMPARISON WITH STATE-OF-ART ACTION LOCALIZATION ||
|---|---|
| TECHNIQUE | MEAN AVERAGE PRECISION (mAP) |
| ACTION LOCALIZATION BY LEARNING SEQUENCE MATCHING NETWORK | 13.6% |
| ACTION LOCALIZATION BY GRAPH CONVOLUTIONAL NETWORK | 15.3% |

FIG. 11

FRAMEWORK FOR FEW-SHOT TEMPORAL ACTION LOCALIZATION

BACKGROUND

The subject disclosure relates to action localization in machine vision, and more specifically to few-shot temporal action localization based on graph convolutional networks. Temporal action localization involves receiving an untrimmed video, locating (e.g., identifying start and stop times of) an action displayed in the untrimmed video, and classifying the action (e.g., identifying the action as running, jumping, throwing, and so on). Conventional temporal action localization techniques require vast amounts of training data, which can be inordinately time-consuming and very expensive to acquire. Few-shot temporal action localization solves this problem by learning how to classify actions based on only a few (e.g., small number of) examples. Most existing few-shot temporal action localization systems utilize a model-agnostic-meta-learning (MAML) framework. Other existing few-shot temporal action localization systems utilize learning sequence matching networks. In any case, systems/techniques that can achieve few-shot temporal action localization with more accuracy/precision than existing few-shot temporal action localization systems/techniques are advantageous.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate few-shot temporal action localization based on graph convolutional networks are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a graph component that can generate a graph. In various cases, the graph can model a support set of temporal action classifications. In one or more aspects, nodes of the graph can correspond to respective temporal action classifications in the support set. In various aspects, edges of the graph can correspond to similarities between the respective temporal action classifications. In various embodiments, the computer-executable components can further comprise a convolution component, which can perform a convolution on the graph. In various instances, the nodes of the graph after convolution can output respective matching scores. In various cases, the respective matching scores can indicate levels of match between the respective temporal action classifications and an action to be classified. In one or more embodiments, the computer-executable components can further comprise an instantiation component that can input into the nodes respective input vectors. In various cases, the respective input vectors can be based on a proposed feature vector representing the action to be classified. In one or more embodiments, the respective temporal action classifications can correspond to respective example feature vectors, and the respective input vectors can be concatenations of the respective example feature vectors with the proposed feature vector representing the action to be classified. In one or more embodiments, the respective example feature vectors can be generated via a first gated recurrent unit based on respective one-shot support videos that display exemplars of the respective temporal action classifications. In various instances, the proposed feature vector can be generated via a second gated recurrent unit based on an untrimmed input video that displays the action to be classified. In one or more embodiments, the similarities can be calculated based on cosine similarities between respective example feature vectors of respective temporal action classifications.

According to one or more embodiments, the above-described system can be implemented as a computer-implemented method. The computer-implemented method can include generating, by a device operatively coupled to a processor, the graph modeling the support set of temporal action classifications and performing, by the device, a convolution on the graph to output the respective matching scores.

According to one or more embodiments, the above-described system can be implemented as a computer program product for facilitating few-shot temporal action localization. The computer program product can comprise a computer readable storage medium having program instructions embodied therewith. The program instructions can be executable by a processing component, which can cause the processing component to generate the graph modeling the support set of temporal action classifications and perform a convolution on the graph.

One or more embodiments of the subject claimed innovation can generate more accurate/precise results than existing few-shot temporal action localization systems/techniques. As mentioned above, existing few-shot temporal action localization systems/techniques utilize either MAML frameworks or learning sequence matching networks. Although such systems/techniques can facilitate few-shot temporal action localization, they compare a proposed feature to be classified with example features in a support set independently (e.g., comparing a proposed feature with a running exemplar, comparing the proposed feature with a jumping exemplar, comparing the proposed feature with a throwing exemplar, and so on). Such systems/techniques fail to take into consideration relationships between the examples/exemplars in the support set (e.g., relationship between the running exemplar and the jumping exemplar, relationship between the jumping exemplar and the throwing exemplar, relationship between the throwing exemplar and the running exemplar, and so on). Various embodiments of the subject claimed innovation can leverage these intra-support-set relationships to improve the efficacy of few-shot temporal action localization. Specifically, one or more embodiments of the subject claimed innovation can generate a graph that models a support set. The support set can include one or more one-shot support video snippets (or support images, in some embodiments), with each one-shot support video snippet exhibiting an exemplar of a corresponding/respective temporal action classification. For instance, the support set can have a first one-shot support video snippet that displays an example of a person running (e.g., a running temporal action classification), a second one-shot support video snippet that displays an example of a person jumping (e.g., a jumping temporal action classification), a third one-shot support video snippet that displays an example of a person throwing an object (e.g., a throwing temporal action classification), and so on. Nodes of the graph can respectively correspond to the temporal action classifications in the support set (e.g., a first node corresponding to the running classification, a second node corresponding to the jumping classification, a third node corresponding to the throwing classification, and so on). Edges of the graph can correspond to similarities between the temporal action classifications (e.g., an edge between the first node and the second node can correspond to a similarity value between the running classification and the jumping classification, an edge between the second node and the third node can correspond to a similarity value between the jumping classification and the throwing classification, an edge between the first node and the third node can correspond to a similarity value between the running classification and the throwing classification, and so on). In various embodiments, the similarities can be based on cosine similarity values between vectors representing the exemplars of the respective action classifications. A convolution can then be performed on the graph, via a trained graph convolutional network, to pass messages, which can cause each node to output a matching score. The matching score of each node can indicate a level of match between the action classification corresponding to that node and an action to be classified (e.g., an action displayed in an untrimmed input video). In various cases, the action classification having the highest matching score can be determined to classify the action. Experimental results, as measured via mean average precision (mAP), indicate that facilitating few-shot temporal action localization via graph convolutional networks yields significantly higher accuracy/precision than existing few-shot temporal action localization systems/techniques on the same data set.

In all, various embodiments of the subject claimed innovation can leverage relationships between examples in a support set in order to improve the efficacy of few-shot temporal action localization. By modeling the support set as a graph and convolving the graph via a trained graph convolutional network, various embodiments of the subject claimed innovation can yield more accurate/precise temporal action localization results than can existing few-shot temporal action localization systems/techniques.

DESCRIPTION OF THE DRAWINGS

FIG. 11 illustrates a table of example, non-limiting results of few-shot temporal action localization via graph convolutional networks in accordance with one or more embodiments described herein.

DETAILED DESCRIPTION

Figure 1:
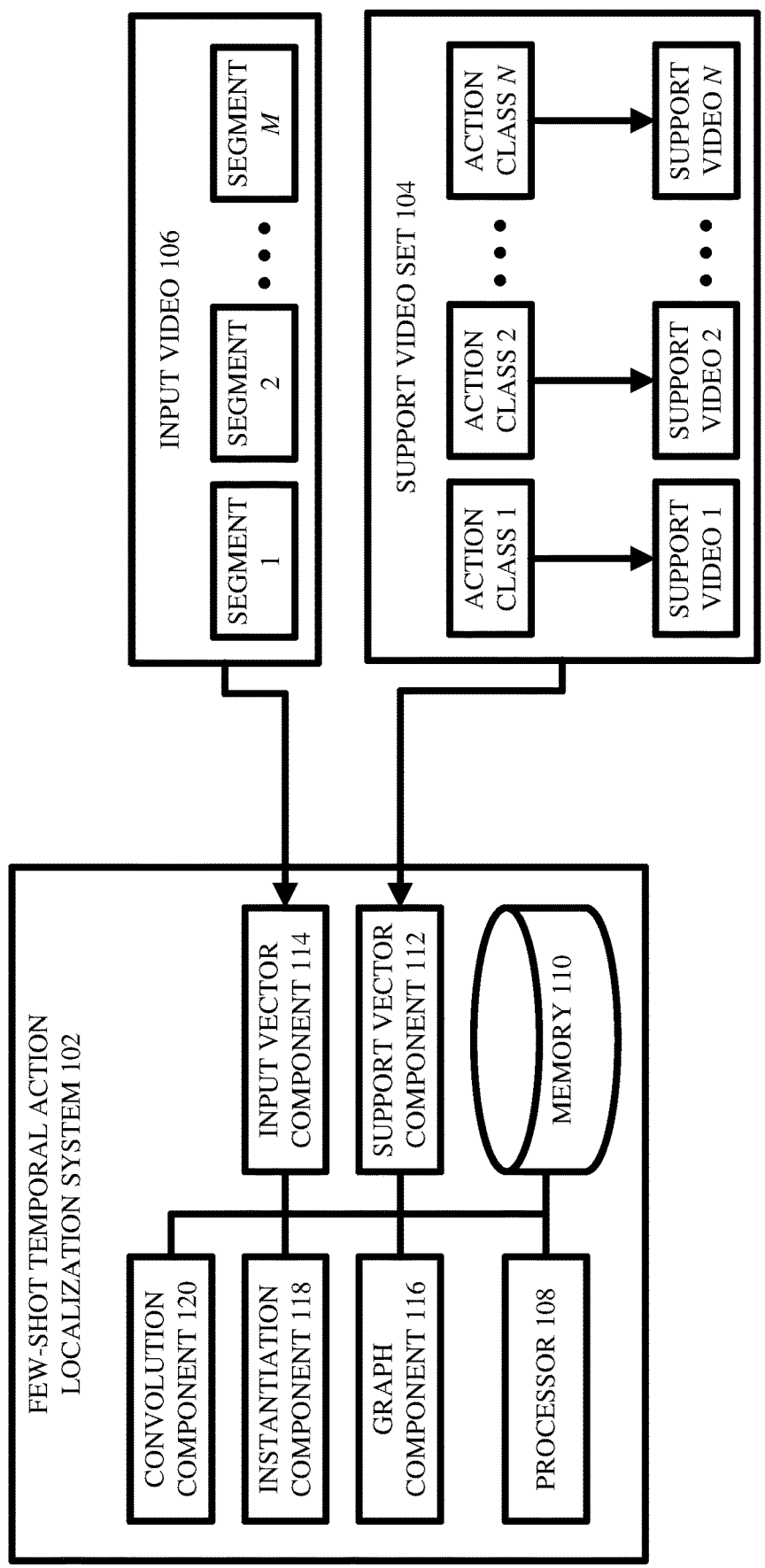
FIG. 1 illustrates a block diagram of an example, non-limiting system that facilitates few-shot temporal action localization via graph convolutional networks in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Temporal action localization is a branch of machine learning and/or machine vision that involves receiving an untrimmed input video (e.g., a video snippet), locating (e.g., identifying a start time and a stop time associated with) an action displayed in the untrimmed input video, and classifying the action (e.g., determining that the action exhibits a person, animal, and/or other entity running, jumping, throwing an object, swimming, playing volleyball, climbing a tree, eating food, driving a vehicle, sleeping, watching a movie, playing an instrument, laughing, crying, fighting, falling, otherwise engaging in some identified activity and/or inactivity, and so on). Generally, temporal action localization requires large amounts of training data, which can be time-consuming and expensive to collect. Few-shot temporal action localization solves this problem by learning to classify actions based on only a few examples (hence the name). Existing few-shot temporal action localization techniques utilize MAML frameworks or learning sequence matching networks. In either case, a proposed action is compared to action exemplars independently. The inventors of the subject claimed innovation were the first to realize that improved accuracy/precision in few-shot temporal action localization could be achieved by taking into account relationships between the action exemplars themselves. Various embodiments of the subject claimed innovation accomplish this by modeling the support set as a graph and convolving the graph via a trained graph convolutional network.

Embodiments described herein include systems, computer-implemented methods, apparatus, and/or computer program products that facilitate few-shot temporal action localization based on graph convolutional networks. In one or more embodiments, a support set can include one or more one-shot support videos respectively corresponding to one or more temporal action classifications. For instance, the one-shot support videos can be short video snippets, with each short video snippet displaying an example of a corresponding/respective temporal action classification (e.g., a first snippet demonstrating a person running, a second snippet demonstrating a person jumping, a third snippet demonstrating a person throwing an object, and so on). In various instances, each one-shot support video (and thus each temporal action classification) can correspond to an example feature vector generated by a gated recurrent unit based on the one-shot support videos (e.g., a first vector representing the running classification, a second vector representing the jumping classification, a third vector representing the throwing classification, and so on). In various aspects, a graph can be generated that models the support set. Nodes of the graph can respectively correspond to the temporal action classifications (e.g., a first node corresponding to the running classification, a second node corresponding to the jumping classification, a third node corresponding to the throwing classification, and so on). Edges of the graph can correspond to similarities between respective temporal action classifications (e.g., an edge between the running node and the jumping node can correspond to a similarity between the running classification and the jumping classification, an edge between the jumping node and the throwing node can correspond to a similarity between the jumping classification and the throwing classification, an edge between the running node and the throwing node can correspond to a similarity between the running classification and the throwing classification, and so on). In various embodiments, the similarities can be computed based on cosine similarities of the example feature vectors (e.g., the similarity between the running classification and the jumping classification can be a cosine similarity between the running vector and the jumping vector, the similarity between the jumping classification and the throwing classification can be a cosine similarity between the jumping vector and the throwing vector, the similarity between the running classification and the throwing classification can be a cosine similarity between the running vector and the throwing vector, and so on). In various instances, an untrimmed input video can be received and an action to be classified can be localized within the untrimmed input video (e.g., start time in the untrimmed input video and stop time in the untrimmed input video of the action to be classified can be determined). A proposed feature vector representing the action to be classified can be generated by a gated recurrent unit based on the untrimmed input video. In various embodiments, respective concatenations can be formed by concatenating the proposed feature vector with each of the respective example feature vectors (e.g., concatenating the proposed feature vector with the running vector, concatenating the proposed feature vector with the jumping vector, concatenating the proposed feature vector with the throwing vector, and so on). The respective concatenations can be inputted into the respective nodes, and the graph can be convolved (e.g., by a trained graph convolutional network), such that the nodes of the convolved graph can output matching scores. Each node's matching score can correspond to a level of match between the temporal action classification corresponding to that node and the action to be classified (e.g., the action displayed in the untrimmed input video). In various instances, the action can be determined to belong to a temporal action classification corresponding to a highest matching score.

Various embodiments of the subject claimed innovation can be employed to use hardware and/or software to solve problems that are highly technical in nature (e.g., to facilitate few-shot temporal action localization based on graph convolutional networks), that are not abstract and that cannot be performed as a set of mental acts by a human. Further, some of the processes performed can be performed by a specialized computer (e.g., graph generator, cosine similarity calculator, trained graph convolutional network, and so on) for carrying out defined tasks related to few-shot temporal action localization (e.g., generation of a graph that models a support set of temporal action classifications, inputting into the nodes of the graph concatenations of a proposed feature vector of an action to be classified with example feature vectors respectively corresponding to the temporal action classifications, convolving the graph to classify the action by taking into account similarities between the temporal action classifications in the support set, and so on). In various embodiments, the subject claimed innovation can be employed to solve new problems that arise through advancements in technology, computer networks, the Internet, and the like. In various aspects, the subject claimed innovation can provide technical improvements to the field of few-shot temporal action localization, by modeling a support set of example actions with a graph in order to take into consideration the similarities between each of the example actions. By leveraging the relationships/similarities between the example actions, various embodiments of the subject claimed innovation can provide more accurate/precise few-shot temporal action localization than can conventional systems. Such few-shot temporal action localization based on graph convolutional networks thus constitutes a concrete and tangible technical improvement in the prior art.

FIG. 1 illustrates a block diagram of an example, non-limiting system 100 that can facilitate few-shot temporal action localization via graph convolutional networks in accordance with one or more embodiments described herein. As shown, a few-shot temporal action localization system 102 can perform few-shot temporal action localization on an input video 106 by leveraging a support video set 104.

In various embodiments, the input video 106 can be an untrimmed video of any length (e.g., a commercial advertisement, an infomercial, a 15-minute Internet snippet, a full-length video feature, a sitcom episode, security camera footage, body-camera footage, dashcam footage, and so on). In various embodiments, the input video 106 can be prerecorded. In various other embodiments, the input video 106 can be a live-streamed (or nearly-live-streamed) video (e.g., live video feed from a security camera, live video feed from a drone or other autonomous vehicle, live video feed from a news reporter, live video feed from a smart phone or other mobile device, and so on). In various cases, the input video 106 can contain one or more video segments having defined start times and stop times within the input video 106 (e.g., segment 1 can start at time $t_0$ and end at time $t_1$, segment 2 can start at time $t_1$ and end at time $t_2$, . . . , segment M can start at time $t_{M-1}$ and end at time $t_M$, as illustrated in FIG. 1, where M can be any positive integer). In various instances, one or more of the video segments within the input video 106 can correspond to an action to be classified. For example, the input video 106 can depict a person, animal, and/or other entity engaging in some activity (and/or inactivity) of interest, where the activity of interest begins at time $t_{x-1}$ and ends at time $t_x$ in a recording timeline of the input video 106, where $x \in [0, M]$. In such case, a segment x (not shown in FIG. 1) in the input video 106 can be a video that depicts substantially only that portion of the input video 106 that displays this activity of interest. As explained in detail below, this activity of interest can be localized/classified by one or more embodiments of the subject claimed innovation via graph convolutional networks.

In various embodiments, the support video set 104 can be a set of one or more one-shot support videos (e.g., support video 1, support video 2, . . . , support video N) that respectively correspond to one or more temporal action classifications (e.g., action class 1, action class 2, . . . , action class N, as depicted in FIG. 1, where N can be any positive integer). In various aspects, the one-shot support videos can be short video snippets (e.g., on the order of a few seconds in length, longer or shorter as needed/desired, and so on) that demonstrate and/or display examples/exemplars of actions that respectively correspond to the temporal action classifications. For example, if the action class 1 corresponds to the activity of running, the support video set 104 can contain a first one-shot support video (e.g., support video 1) that depicts an example of a person, animal, and/or other entity engaging in the activity of running (e.g., an athlete running in a marathon). Similarly, if the action class 2 corresponds to the activity of jumping, the support video set 104 can contain a second one-shot support video (e.g., support video 2) that depicts an example of a person, animal, and/or other entity engaging in the activity of jumping (e.g., a person jumping on a trampoline). Further still, if an action class N corresponds to the activity of throwing an object, the support video set 104 can contain an N-th one-shot support video (e.g., support video N) that depicts an example of a person, animal, and/or other entity engaging in the activity of throwing (e.g., a athlete throwing a ball). Although the activities of running, jumping, and throwing are discussed herein to demonstrate various aspects and embodiments of the subject claimed innovation, this disclosure is not limited thereby, and any suitable activities and/or inactivities which can be depicted in short video snippets can be incorporated. In various aspects, any suitable number and/or types of temporal action classifications and corresponding one-shot support videos can be included in the support video set 104 (e.g., running, jumping, throwing, playing, lifting, carrying, eating, drinking, fighting, slipping, falling, rolling, sitting, crawling, climbing, driving, talking, laughing, crying, and so on). In various aspects, any suitable/desired level of generality/specificity can be used when establishing the temporal action classifications and corresponding one-shot support videos in the support video set 104 (e.g., playing any competitive activity versus playing a competitive activity, throwing any object versus throwing a specific object, eating any food versus eating a specific food, operating any vehicle versus operating a specific vehicle, and so on). For instance, in some embodiments, a single temporal action classification can correspond to the generic activity of jumping, and so any segment of the input video 106 that depicts a person, animal, and/or other entity jumping into the air can be classified as belonging to the jumping temporal action classification, regardless of whether the person, animal, and/or other entity was performing a long jump (e.g., a track-and-field activity), a high jump (e.g., another track-and-field activity), a pole-vault (e.g., still another track-and-field activity), or was merely jumping rope (e.g., a game and/or cardio exercise). In other embodiments, more specific temporal action classifications (and thus more specific one-shot support videos) can be used. For instance, a first temporal action classification can correspond to the activity of long jumping and a first one-shot support video can display an example of an athlete performing a long jump, a second temporal action classification can correspond to the activity of high jumping and a second one-shot support video can display an example of an athlete performing a high jump, a third temporal action classification can correspond to the activity of pole vaulting and a third one-shot support video can display an example of an athlete performing a pole vault, a fourth temporal action classification can correspond to the activity of jumping rope and a fourth one-shot support video can display an example of a person using a jump rope, and so on. As explained in more detail below, various embodiments of the subject claimed innovation can leverage relationships between each of the temporal action classifications (e.g., action class 1, action class 2, . . . , action class N) in the support video set 104, by manipulating vectors generated based on the corresponding one-shot support videos (e.g., support video 1, support video 2, . . . , support video N), in order to classify/localize actions displayed in desired video segments of the input video 106.

In one or more embodiments, the subject claimed innovation can be generalized beyond video analysis. For instance, the systems, computer-implemented methods, apparatus, and/or computer program products taught herein can, in some embodiments, be used for localizing/classifying actions of interest as displayed in the input video 106 based on the action classifications and exemplars contained in the support video set 104. However, in other embodiments, the systems, computer-implemented methods, apparatus, and/or computer program products taught herein can be used for localizing/classifying sounds (e.g., using an input audio file that is analogous to the input video 106 and using a support audio set that is analogous to the support video set 104). In various embodiments, the systems, computer-implemented methods, apparatus, and/or computer program products taught herein can be implemented to localize/classify any type of information in an electronic input file (e.g., input video 106) for which there exist suitable exemplars (e.g., support video set 104). Nonlimiting examples of applications can include visual action classification/localization, aural music and/or musical pattern classification/localization, aural speech classification/localization, olfactory smell classification/localization (e.g., using chemical smell sensors), tactile classification/localization (e.g., using weight distribution sensors), and so on.

In various embodiments, the few-shot temporal action localization system 102 can comprise a processor 108 (e.g., computer processing unit, microprocessor, and so on) and a computer-readable memory 110 that is operably connected to the processor 108. The memory 110 can store computer-executable instructions which, upon execution by the processor 108, can cause the processor 108 and/or other components of the few-shot temporal action localization system 102 (e.g., support vector component 112, input vector component 114, graph component 116, instantiation component 118, convolution component 120, and so on) to perform one or more acts. In various embodiments, the memory 110 can store computer-executable components (e.g., support vector component 112, input vector component 114, graph component 116, instantiation component 118, convolution component 120, and so on), and the processor 108 can execute the computer-executable components.

In one or more embodiments, the few-shot temporal action localization system 102 can, via a support vector component 112, generate one or more example feature vectors that respectively correspond to the one or more temporal action classifications in the support video set 104, based on the one-shot support videos in the support video set 104. In other words, the support vector component 112 can generate an action embedding where each one-shot support video (and thus each action classification) in the support video set 104 has a corresponding vector (e.g., example feature vector) representing it. In various embodiments, the support vector component 112 can employ one or more gated recurrent units (GRU) to generate such vectors and/or action embeddings. A GRU can be a gating mechanism used in various types of artificial neural networks to avoid the vanishing gradient problem during backpropagation. In various embodiments, other suitable techniques of creating action embeddings (e.g., mapping visually-perceived actions to vectors) can be implemented. In various embodiments, the support vector component 112 can receive and analyze the one-shot support videos (e.g., support video 1, support video 2, . . . , support video N) corresponding to the one or more temporal action classifications (e.g., action class 1, action class 2, . . . , action class N) in the support video set 104, and can generate one or more vectors (referred to as example feature vectors) that correspond to the one or more temporal action classifications. For instance, if the action class 1 corresponds to the activity of running and the support video 1 depicts an example/exemplar of a person running, the support vector component 112 can generate, based on the support video 1, a first example feature vector (a vector having any suitable dimensionality) that represents the activity of running. Similarly, if the action class 2 corresponds to the activity of jumping and the support video 2 depicts an example of a person jumping, the support vector component 112 can generate, based on the support video 2, a second example feature vector that represents the activity of jumping. Further still, if the action class N corresponds to the activity of throwing and the support video N depicts an example of a person throwing an object, the support vector component 112 can generate, based on the support video N, an N-th example feature vector that represents the activity of throwing. In various embodiments, any suitable technique now known or later developed for mapping vectors to activities/actions respectively depicted in one-shot support videos based on the visually-perceived characteristics/properties of the actions can be used (e.g., GRUs, other techniques of creating action embeddings, and so on).

In one or more embodiments, the few-shot temporal action localization system 102 can, via an input vector component 114, generate a proposed feature vector that represents an action to be classified from the input video 106. Similar to the support vector component 112, the input vector component 114 can generate a vector (e.g., an action embedding) that represents an action to be classified, where the action to be classified is detected in at least one video segment of the input video 106. In various embodiments, the input vector component 114 can generate this vector (referred to as proposed feature vector) via one or more GRUs, and/or via any other suitable technique now know or later developed. In various embodiments, the input vector component 114 can receive and analyze a video segment from the input video 106 displaying the action to be classified, and can output a vector (e.g., proposed feature vector) that represents the action to be classified. For example, if segment x (not shown in FIG. 1) of the input video 106 displays a person engaging in an activity of interest, the input vector component 114 can receive the segment x and generate a proposed feature vector that represents the activity of interest based on the activity's visually-perceived characteristics/properties. As explained in detail below, this proposed feature vector can be used along with the example feature vectors generated by the support vector component 112 to classify the activity of interest as one or more of the temporal action classifications in the support video set 104 (e.g., action class 1, action class 2, . . . , action class N).

In various embodiments, the few-shot temporal action localization system 102 can, via a graph component 116, generate a graph that models the support video set 104. In various embodiments, the graph can capture the relations between the temporal action classifications in the support video set 104 (e.g., capture how action class 1, action class 2, . . . , and action class N relate to each other). Specifically, nodes of the graph can correspond to the temporal action classifications. For instance, the graph can have a first node that corresponds to the action class 1, a second node that corresponds to the action class 2, an N-th node that corresponds to the action claim N, and so on. Moreover, edges of the graph can correspond (and/or can have weights that correspond) to similarities between the temporal action classifications. For instance, an edge between the node corresponding to the action class 1 and the node corresponding to the action class 2 can represent a similarity value between the action class 1 and the action class 2 (e.g., a similarity between the support video 1 and the support video 2). In various aspects, this similarity value can be computed as a cosine similarity between the example feature vector associated with the action class 1 and the example feature vector associated with the action class 2. In various embodiments, other measures of similarity can be implemented (e.g., Euclidean distance between example feature vectors, normalized Euclidean distance between example feature vectors, and so on). In various embodiments, larger similarity values can be used to designate more similar example feature vectors (e.g., the similarity value can be $\cos(\theta)$, where $\theta$ represents the angle between two example feature vectors, such that similarity values closer to 1 indicate more similarity and similarity values closer to 0 indicate less similarity). In various other embodiments, smaller similarity values can be used to designated more similar example feature vectors (e.g., the similarity value can be sin(θ), where θ represents the angle between two example feature vectors, such that similarity values closer to 0 indicate more similarity and similarity values closer to 1 indicate less similarity). In various embodiments, other ways of mathematically measuring the similarity between two example feature vectors can be implemented. In various embodiments, the graph generated by the graph component 116 can be undirected. In various aspects, an undirected graph having N nodes can have ½N(N−1) edges (e.g., a complete and/or fully connected graph). In various embodiments, a graph (whether directed or undirected) can have fewer edges. In any case, the graph component 116 can generate a graph, the nodes of which respectively correspond to the temporal action classifications in the support video set 104, and the edges of which correspond to similarities between respective temporal action classifications. By modeling the support video set 104 with such a graph, the inter-relationships between the one-shot support videos (e.g., between the action exemplars) in the support video set 104 can be quantified and leveraged to boost the efficacy of temporal action localization/classification. As explained above, conventional systems that facilitate few-shot temporal action localization fail to consider these inter-relationships. Instead, conventional techniques independently compare the action to be classified with each action exemplar, all without taking into account how the action exemplars relate to each other. Experimental results show that various embodiments of the subject claimed innovation outperform conventional systems precisely because the subject claimed innovation leverages the inter-relationships between the temporal action classifications in the support video set 104.

In various embodiments, the few-shot temporal action localization system 102 can, via an instantiation component 118, input into the nodes of the graph generated by the graph component 116 certain input vectors. In various instances, these input vectors can be considered initial and/or instantiated features/properties of the graph. In various cases, the input vectors can be based on the proposed feature vector of the action to be classified. In various cases, the input vectors can be concatenations of the proposed feature vector with respective example feature vectors (e.g., the input vector for the first node can be a concatenation of the proposed feature vector and the example feature vector corresponding to the action class 1, the input vector for the second node can be a concatenation of the proposed feature vector and the example feature vector corresponding to the action class 2, the input vector for the N-th node can be a concatenation of the proposed feature vector and the example feature vector corresponding to the action class N, and so on). In various embodiments, the concatenations can be formed by linking one end of the proposed feature vector to one end of the respective example feature vector (e.g., if the proposed feature vector is a p-by-1 vector for some positive integer p and the respective example feature vector is also a p-by-1 vector, then the concatenation can be a 2p-by-1 vector). In various instances, the proposed feature vector can be listed first in the concatenation. In various instances, the respective example feature vector can be listed first in the concatenation. Thus, in various embodiments, the graph generated by the graph component 116 can include nodes corresponding to the respective temporal action classifications and edges corresponding to similarities between the respective temporal action classifications. Moreover, the nodes can be instantiated with respective concatenations of the proposed feature vector with respective example feature vectors. In various cases, such a graph structure can be used to boost the accuracy/precision of few-shot temporal action localization as compared to conventional techniques.

In various embodiments, the few-shot temporal action localization system 102 can, via a convolution component 120, perform a convolution on the graph generated by the graph component 116 after input of the respective concatenations by the instantiation component 118. In various embodiments, the convolution component 120 can employ a graph convolutional network (e.g., a convolutional neural network that operates on graphs) to perform the convolution. In various aspects, a graph convolutional network is a convolutional neural network (e.g., a specific type of artificial neural network) that takes as input a graph having a feature/property description for each node of the graph, and also takes as input a representative description of the graph structure in matrix form (e.g., an adjacency matrix or function thereof), and produces some node-level output (e.g., some output value for each node of the graph). In various embodiments, the convolution component 120 can utilize a graph convolutional network to perform a convolution on the graph generated by the graph component 116 and instantiated by the instantiation component 118, which can cause the nodes of the convolved graph to output matching scores. Each matching score can be a value that indicates a level of match between the temporal action classification corresponding to the particular node and the action to be classified. In various embodiments, the action to be classified can be determined to belong to a temporal action classification having a highest matching score (e.g., if numerically higher matching scores indicate stronger match probability). In various embodiments, the action to be classified can be determined to belong to a temporal action classification having a lowest matching score (e.g., if numerically lower matching scores indicate stronger match probability). In various embodiments, the graph convolutional network employed by the convolution component 120 can be trained (e.g., supervised training, unsupervised training, reinforcement learning, and so on) to take as input graph structures and produce as output node-level matching scores. As explained above, conventional techniques that facilitate few-shot temporal action localization do not model the support video set 104 as a graph and perform convolutions on the graph in order to classify/localize actions of interest. Yet, the inventors' experimental results indicate that few-shot temporal action localization via graph convolutional networks achieves significantly better accuracy/precision than do conventional techniques on the same data sets.

To clarify FIG. 1, consider the following nonlimiting example. Suppose that the input video 106 is a gym membership commercial that includes a video segment depicting an athlete climbing a rock wall. Assume that this video segment contains the action to be classified; that is, the ultimate goal can be for the few-shot temporal action localization system 102 to determine that the video segment in question depicts a person engaged in the activity of climbing. Now, suppose that the support video set 104 includes three temporal action classifications (e.g., swimming, climbing, and lifting) and thus also includes three one-shot support videos demonstrating exemplars of those three temporal action classifications (e.g., a first short video snippet displaying an example of a person swimming in a pool, a second short video snippet displaying an example of person climbing a tree, and a third short video snippet displaying an example of a person lifting a barbell). In this nonlimiting example, the support vector component 112 can receive the support video set 104 and can generate, based on the one-shot support videos, an example feature vector for each temporal action classification (e.g., a first example feature vector representing the swimming exemplar, a second example feature vector representing the climbing exemplar, and a third example feature vector representing the lifting exemplar). Similarly, the input vector component 114 can receive the video segment containing the action to be classified (e.g., the athlete climbing the rock wall) from the input video 106 and can generate, based on the video segment, a proposed feature vector representing the action to be classified (e.g., a vector that represents the athlete climbing the rock wall). In various aspects, the graph component 116 can generate an undirected graph that models the support video set 104. Specifically, the graph can have three nodes (e.g., a first node corresponding to the swimming temporal action classification, a second node corresponding to the climbing temporal action classification, and a third node corresponding to the lifting temporal action classification). Moreover, the graph can have three edges (e.g., ½N(N−1), with N=3), with the edges representing similarities between the three temporal action classifications (e.g., a first edge between the swimming node and the climbing node corresponding to the similarity between the swimming classification and the climbing classification, a second edge between the climbing node and the lifting node corresponding to the similarity between the climbing classification and the lifting classification, and a third edge between the swimming node and the lifting node corresponding to the similarity between the swimming classification and the lifting classification). In various aspects, the similarity values can be computed as cosine similarities between the respective example feature vectors (e.g., the weight of the first edge computed as a cosine similarity between the swimming example feature vector and the climbing example feature vector, the weight of the second edge computed as a cosine similarity between the climbing example feature vector and the lifting example feature vector, and the weight of the third edge computed as a cosine similarity between the swimming example feature vector and the lifting example feature vector). In various instances, the instantiation component 118 can input into each node of the graph a respective concatenation of the proposed feature vector and the node's respective example feature vector (e.g., input into the swimming node a concatenation of the proposed feature vector and the swimming example feature vector, input into the climbing node a concatenation of the proposed feature vector and the climbing example feature example, and input into the lifting node a concatenation of the proposed feature vector and the lifting example feature vector). In various aspects, the convolution component 120 can perform, via a trained graph convolutional network, a convolution on the generated and instantiated graph. In various instances, the nodes of the convolved graph can each output a matching score. In this case, the matching score outputted by the climbing node can be higher than the matching scores outputted by the swimming node or the lifting node. Thus, it can be determined that the proposed feature vector (and therefore the action to be classified) is most similar to the climbing example feature vector, which indicates that the action (e.g., the athlete climbing the rock wall) can be classified as an instance of climbing.

As a simplified and nonlimiting explanation, various embodiments of the subject claimed innovation can leverage interrelationships between temporal action classifications in a support set using graph convolutional networks in order to boost efficacy of action localization/classification. Quite simply, conventional few-shot temporal action classification techniques do not model the interrelationships between the temporal action classifications (e.g., the action classes) as a graph, nor do they use graph convolutional networks to classify/localize actions.

Figure 2:
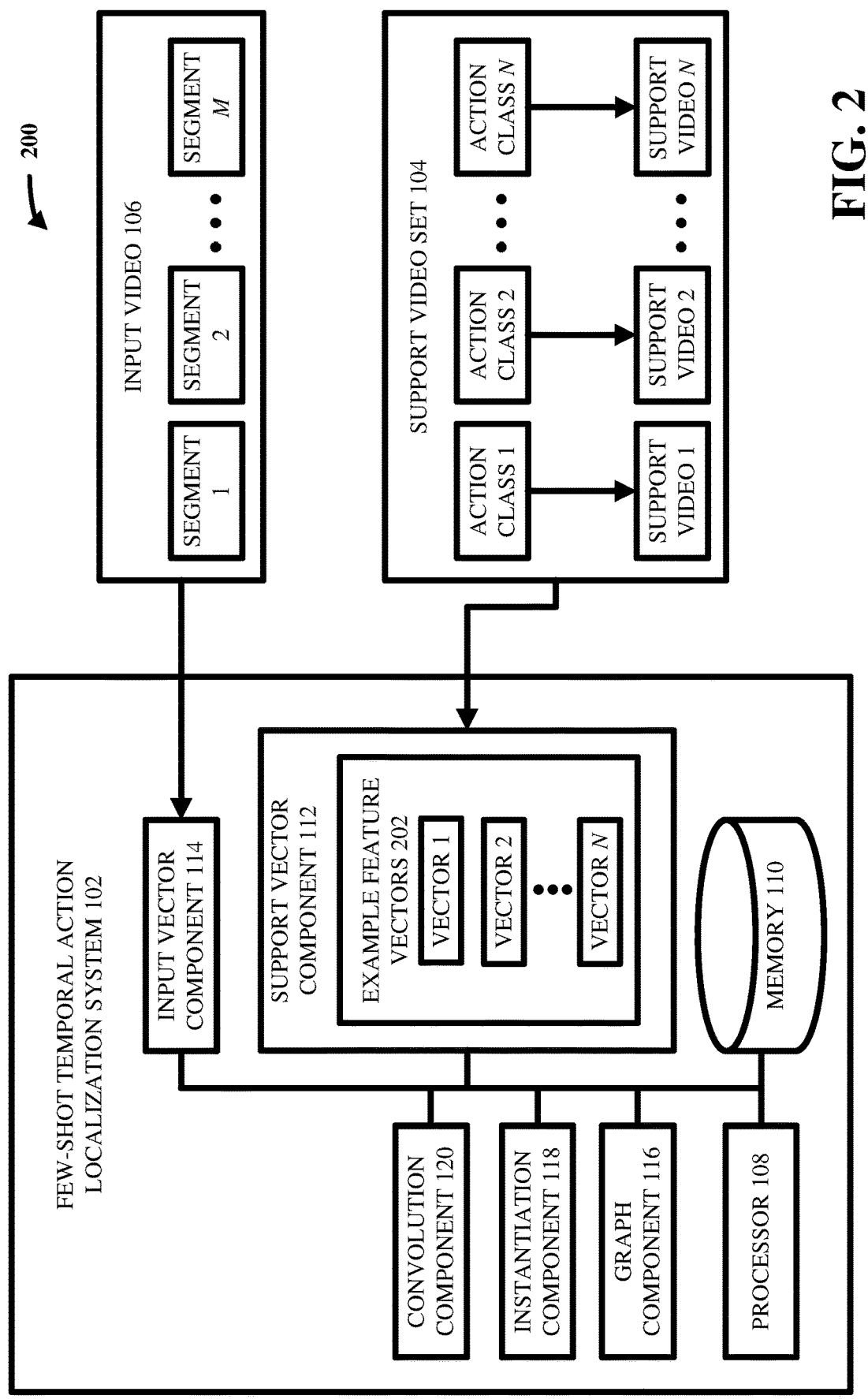
FIG. 2 illustrates a block diagram of an example, non-limiting system including example feature vectors that facilitates few-shot temporal action localization via graph convolutional networks in accordance with one or more embodiments described herein.

FIG. 2 illustrates a block diagram of an example, nonlimiting system 200 including example feature vectors that can facilitate few-shot temporal action localization via graph convolutional networks in accordance with one or more embodiments described herein. As shown, the system 200 can, in various embodiments, include the same components as the system 100, and can further comprise example feature vectors 202.

As explained above, in one or more embodiments, the support vector component 112 can receive the support video set 104 and can generate, based on the visually-perceived characteristics/properties displayed in the one-shot support videos (e.g., support video 1, support video 2, . . . , support video N) in the support video set 104, example feature vectors 202. In various aspects, the example feature vectors 202 can include a separate vector corresponding to each temporal action classification in the support video set 104 (e.g., vector 1 can be based on support video 1 and correspond to action class 1, vector 2 can be based on support video 2 and correspond to action class 2, . . . , vector N can be based on support video N and correspond to action class N, and so on). In various instances, each of these example feature vectors can represent its corresponding action exemplar (e.g., vector 1 can represent the characteristics/properties of the exemplary action that is depicted in the support video 1, vector 2 can represent the characteristics/properties of the exemplary action that is depicted in the support video 2, . . . , vector N can represent the characteristics/properties of the exemplary action that is depicted in the support video N, and so on). As explained above, any suitable technique for generating the example feature vectors 202 based on the support video set 104 now known or later developed can be incorporated in various embodiments of the subject claimed innovation. For instance, one or more gated recurrent units can be used by the support vector component 112 to analyze each of the one-shot support videos in the support video set 104 and thereby assign to each one-shot support video (and thus to each temporal action classification) a unique vector based on the characteristics/properties depicted by that one-shot support video. In various instances, any other suitable action-embedding technique that can map a visually-perceived action to a unique numeric vector based on the characteristics/properties of that visually-perceived action can be implemented. To continue the above example where the input video 106 is a gym membership commercial and a video segment of the input video 106 depicts an athlete climbing a rock wall, the action class 1 can correspond to a swimming classification, the action class 2 can correspond to a climbing classification, and the action class N can correspond to a lifting classification. Each of these classifications can have an associated one-shot support video in the support video set 104 (e.g., support video 1 can be a short video snippet depicting an example of a person swimming, support video 2 can be a short video snippet depicting an example of a person climbing, and support video N can be a short video snippet depicting an example of a person lifting weights). Based on the support video 1, the support video 2, and the support video N, the support vector component 112 can generate the corresponding example feature vectors 202, with vector 1 representing support video 1 and action class 1, vector 2 representing support video 2 and action class 2, and vector N representing support video N and action class N.

Figure 3:
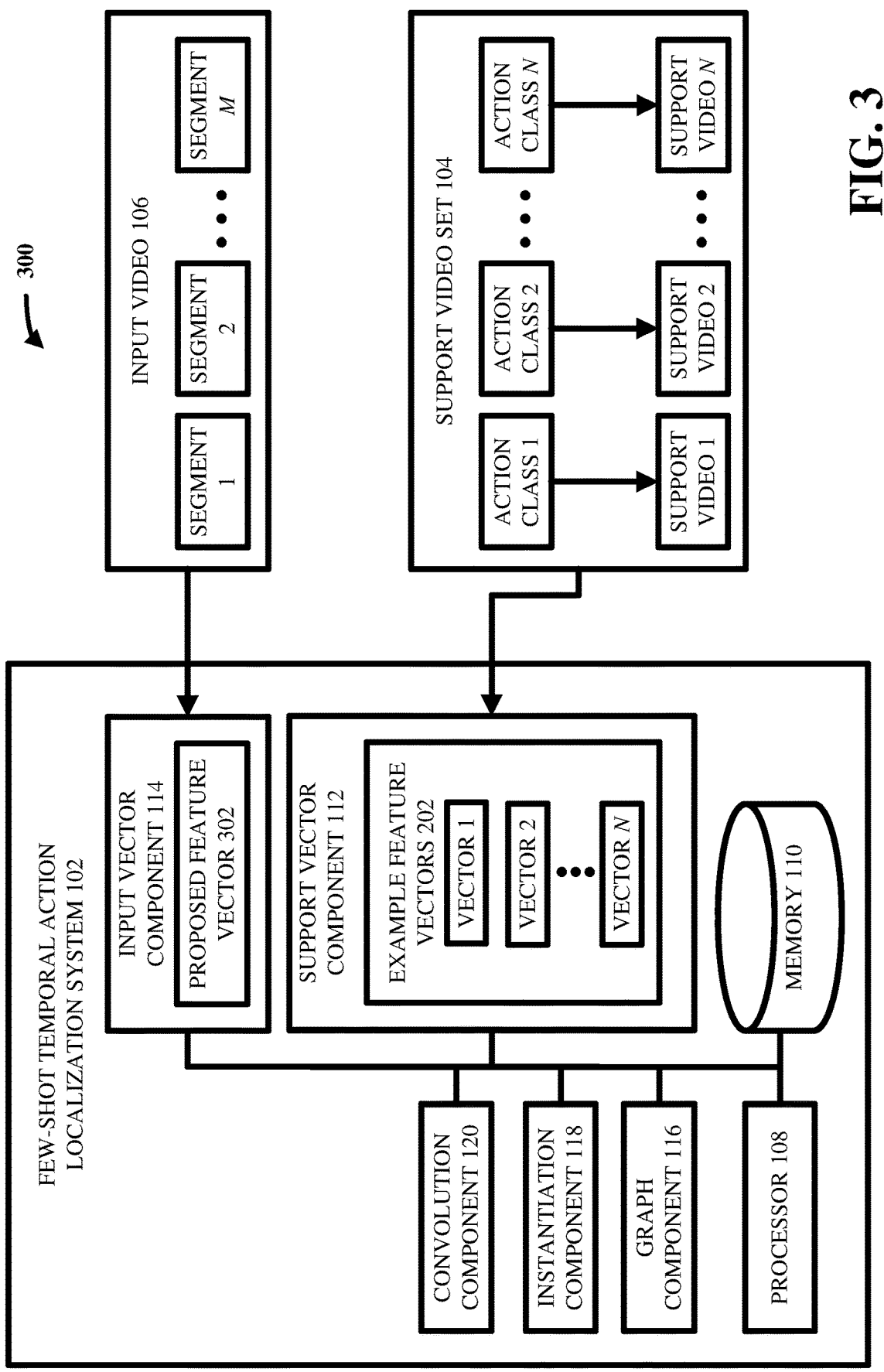
FIG. 3 illustrates a block diagram of an example, non-limiting system including a proposed feature vector that facilitates few-shot temporal action localization via graph convolutional networks in accordance with one or more embodiments described herein.

FIG. 3 illustrates a block diagram of an example, non-limiting system including a proposed feature vector that can facilitate few-shot temporal action localization via graph convolutional networks in accordance with one or more embodiments described herein. As shown, the system 300 can, in various embodiments, comprise the same components as the system 200, and can further comprise a proposed feature vector 302.

As explained above, in one or more embodiments, the input vector component 114 can receive a video segment of the input video 106 that displays an action to be classified and can generate, based on the received video segment, the proposed feature vector 302. In various aspects, the proposed feature vector 302 can be a numerical vector that represents the action to be classified, and can be based on the visually-perceived characteristics/properties of the action to be classified as depicted in the received video segment. As explained above, any suitable technique for generating the proposed feature vector 302 based on the received video segment from the input video 106 now known or later developed can be incorporated in various embodiments of the subject claimed innovation. For instance, one or more gated recurrent units can be used by the input vector component 114 to analyze the action to be classified in the received video segment from the input video 106 and thereby assign to the action to be classified a unique vector that quantifies the action's characteristics/properties. In various instances, any other suitable action-embedding technique that can map a visually-perceived action to a unique numeric vector based on the characteristics/properties of that visually-perceived action can be implemented. To continue the above example involving the gym membership commercial that depicts an athlete climbing a rock wall, the input vector component 114 can receive from the input video 106 a video segment that displays the athlete climbing the rock wall. Based on the received video segment, the input vector component 114 can generate the proposed feature vector 302, where the proposed feature vector 302 is a numerical vector that represents and/or quantifies the snippet of the athlete climbing the rock wall. As explained above, the proposed feature vector 302 can be used along with the example feature vectors 202 in order to perform few-shot temporal action localization via graph convolutional networks.

Figure 4:
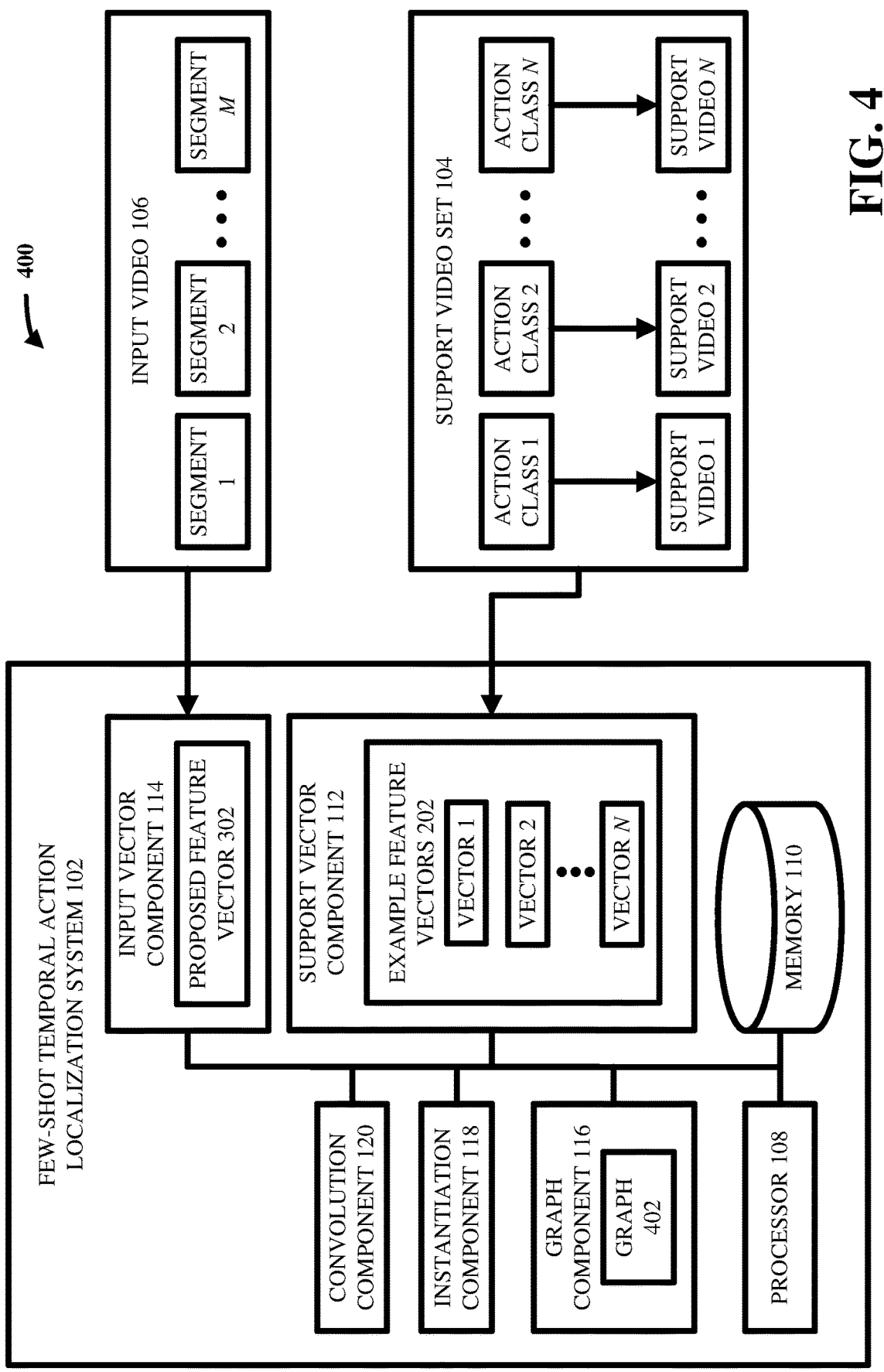
FIG. 4 illustrates a block diagram of an example, non-limiting system including a graph that facilitates few-shot temporal action localization via graph convolutional networks in accordance with one or more embodiments described herein.

FIG. 4 illustrates a block diagram of an example, non-limiting system 400 including a graph that can facilitate few-shot temporal action localization via graph convolutional networks in accordance with one or more embodiments described herein. As shown, the system 400 can, in various embodiments, comprise the same components as the system 300, and can further comprise a graph 402.

As explained above, in various embodiments, the graph component 116 can generate the graph 402 that models the support video set 104. More particularly, the graph 402 can model/capture the interrelationships between the temporal action classifications in the support video set 104 (e.g., captures how action class 1 as exemplified by support video 1 relates to every other action class in the support video set 104, captures how action class 2 as exemplified by support video 2 relates to every other action class in the support video set 104, . . . , captures how action class N as exemplified by support video N relates to every other action class in the support video set 104, and so on). Specifically, the nodes of the graph 402 can each correspond to a respective temporal action classification (e.g., a first node in the graph 402 can correspond to action class 1, a second node in the graph 402 can correspond to action class 2, . . . , an N-th node in the graph 402 can correspond to action class N, and so on). Additionally, the edges (e.g., and/or weights associated with the edges) of the graph 402 can correspond to similarities between respective temporal action classifications (e.g., an edge between the first node and the second node can correspond to a similarity between action class 1 and action class 2, an edge between the second node and the N-th node can correspond to a similarity between action class 2 and action class N, a similarity between the first node and the N-th node can correspond to a similarity between action class 1 and action class N, and so on). In various embodiments, these similarities can be computed based on cosine similarities between respective example feature vectors 202 (e.g., the similarity between action class 1 and action class 2 can be computed as a cosine similarity between vector 1 and vector 2, the similarity between action class 2 and action class N can be computed as a cosine similarity between vector 2 and vector N, the similarity between action class 1 and action class N can be computed as a cosine similarity between vector 1 and vector N, and so on). In various instances, the cosine similarity of two vectors $\vec{X}$ and $\vec{Y}$ is simply the cosine of the angle between those vectors (e.g., $\cos(\theta)$). This can be computed using the Euclidean dot product according to the following formula:

$$\cos\theta = \frac{\vec{X}\cdot\vec{Y}}{\|\vec{X}\|\|\vec{Y}\|}$$

In various embodiments, other mathematical measures of similarity can be used (e.g., Euclidean distance, and so on). In various embodiments, the graph 402 can be undirected. In various aspects, the graph 402 can have N nodes (e.g., the same number as temporal action classifications in the support video set 104) and can have ½N(N−1) edges (e.g., a complete and/or fully-connected graph). In various embodiments, the graph 402 (whether directed or undirected) can have fewer edges (e.g., an incomplete graph). To continue the above example where the input video 106 is a gym membership commercial, the graph 402 can have three nodes corresponding to the three temporal action classifications (e.g., a first node corresponding to the swimming action class, a second node corresponding to climbing action class, and a third node corresponding to the lifting action class). The weight of the edge between the first node and the second node can correspond to the similarity between the swimming action class and the climbing action class, the weight of the edge between the second node and the third node can correspond to the similarity between the climbing action class and the lifting action class, and the weight of the edge between the first node and the third node can correspond to the similarity between the swimming action class and the lifting action class.

Figure 5:
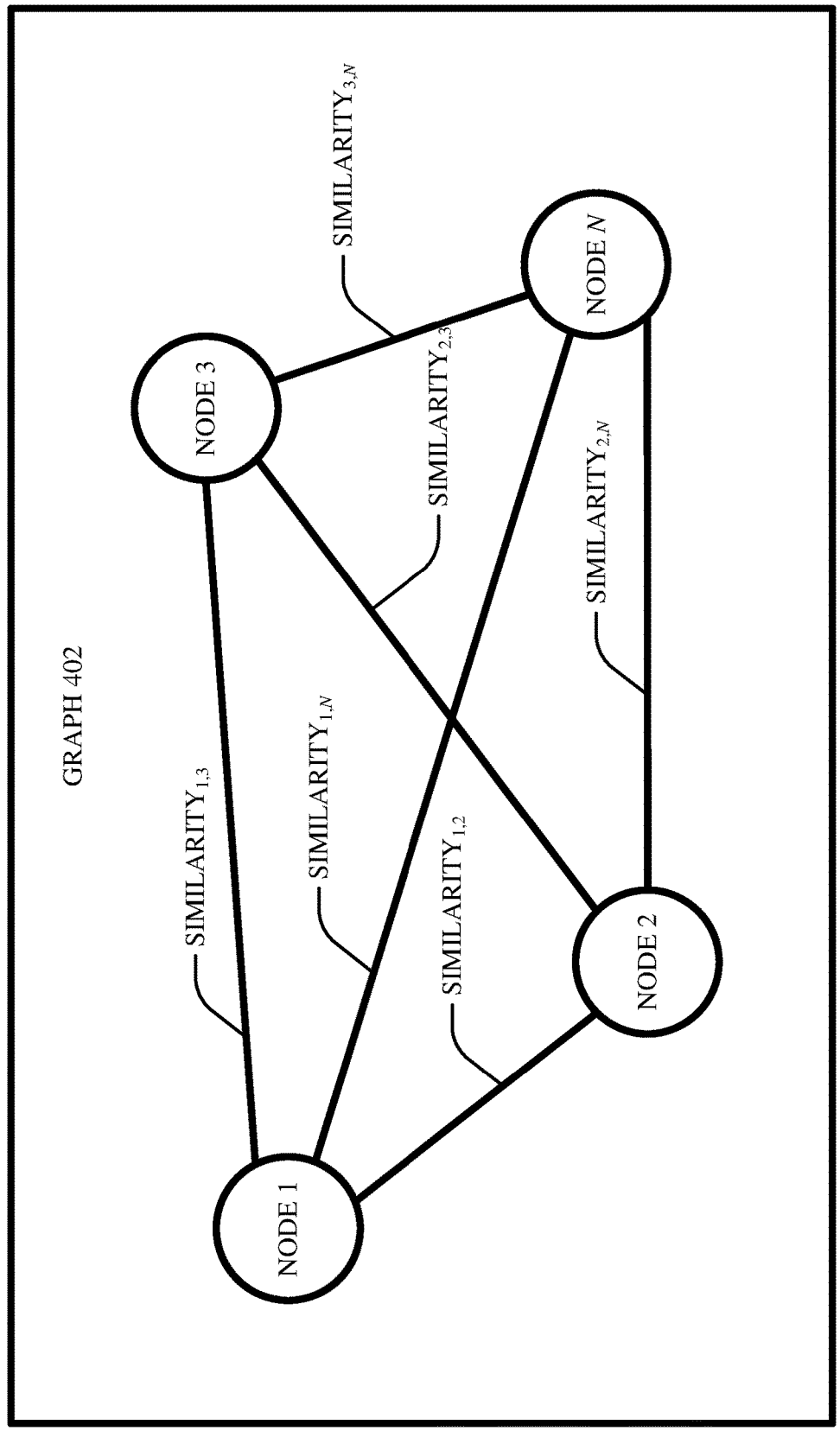
FIG. 5 illustrates a diagram of an example, non-limiting graph that facilitates few-shot temporal action localization via graph convolutional networks in accordance with one or more embodiments described herein.

FIG. 5 illustrates a diagram 500 of an example, non-limiting graph that facilitates few-shot temporal action localization via graph convolutional networks in accordance with one or more embodiments described herein.

In various embodiments, the diagram 500 can be a more detailed illustration of the graph 402 generated by the graph component 116. As shown, the graph 402 can, in one or more embodiments, include a node 1 that can correspond to action class 1 in the support video set 104, a node 2 that can correspond to action class 2 in the support video set 104, a node 3 that can correspond to action class 3 (not depicted in the FIG. 4) in the support video set 104, and a node N that corresponds to action class N in the support video set 104. Although FIG. 5 depicts only four nodes in the graph 402, any suitable/desired number of nodes can be included (e.g., N can be any suitable/desired positive integer). In some embodiments, the number of nodes of the graph 402 can be equal to the number of temporal action classifications in the support video set 104. As shown, an edge between node 1 and node 2 can represent a similarity$_{1,2}$ (e.g., that is, a similarity value between action class 1 and action class 2). As explained thoroughly above, the similarity value can be computed via the cosine similarity calculation between vector 1 (e.g., corresponding to action class 1 and generated based on support video 1) and vector 2 (e.g., corresponding to action class 2 and generated based on support video 2) Likewise, an edge between node 1 and node 3 can represent a similarity$_{1,3}$ computed via a cosine similarity calculation between vector 1 and vector 3 (not shown in FIG. 4); an edge between node 2 and node 3 can represent a similarity$_{2,3}$ computed via a cosine similarity calculation between vector 2 and vector 3; an edge between node 1 and node N can represent a similarity$_{1,N}$ computed via a cosine similarity calculation between vector 1 and vector N; an edge between node 2 and node N can represent a similarity$_{2,N}$ computed via a cosine similarity calculation between vector 2 and vector N; and an edge between node 3 and node N can represent a similarity$_{3,N}$ computed via a cosine similarity calculation between vector 3 and vector N. As shown, the graph 402 can, in various embodiments, be complete and/or fully-connected, and so the graph 402 can have ½N(N−1) edges if the graph 402 has N nodes. In the nonlimiting example depicted in FIG. 5, the graph 402 has four nodes, and so it has six edges (e.g., 0.5*4*(4−1)=6). As explained thoroughly above, modeling the support video set 104 via the graph 402 can capture and/or quantify interrelationships between the temporal action classifications in the support video set 104 (e.g., quantify relationships between action class 1, action class 2, . . . , and action class N). Leveraging these interrelationships via a graph convolutional network as described herein can significantly improve the efficacy of few-shot temporal action localization.

Figure 6:
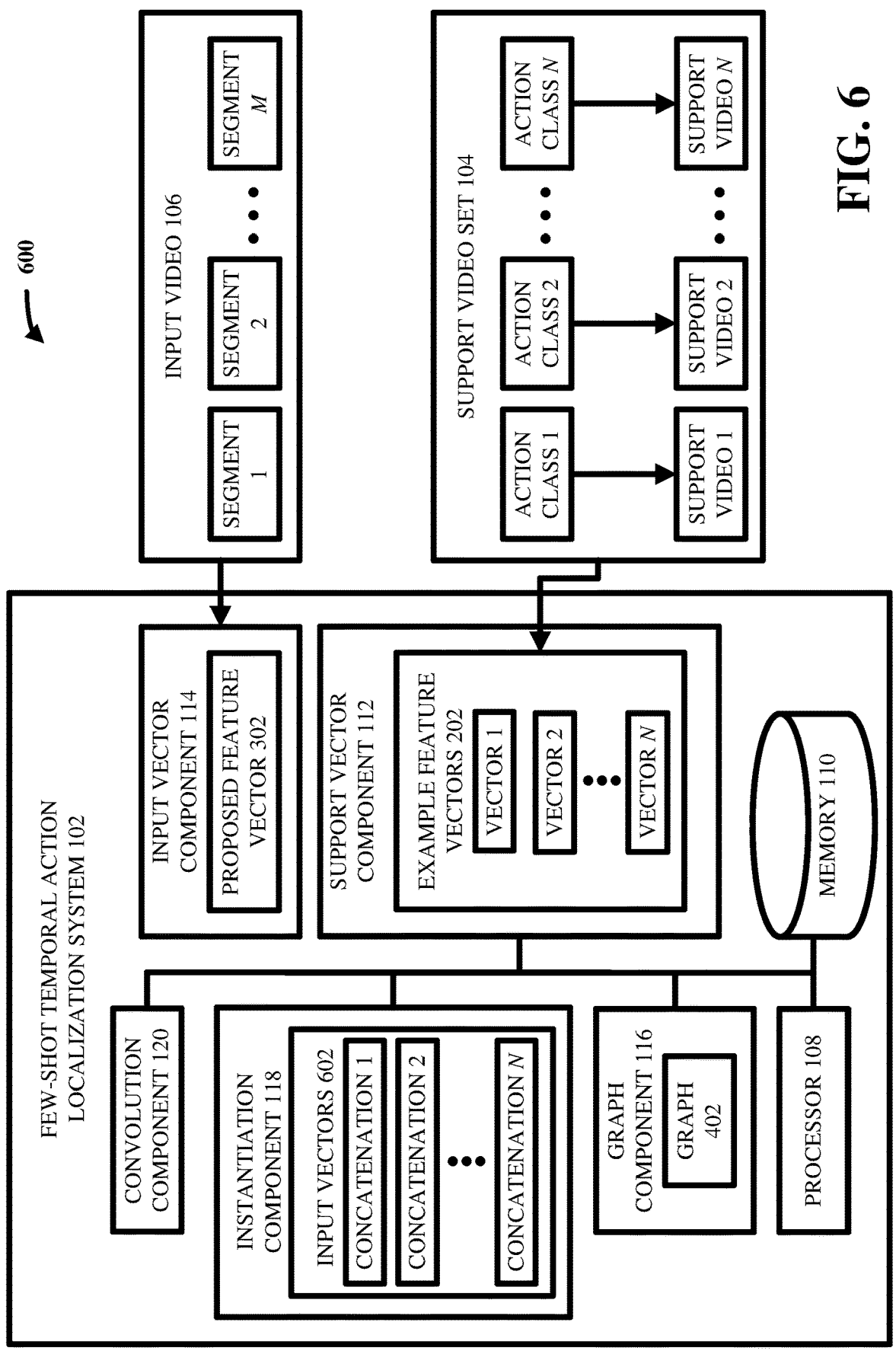
FIG. 6 illustrates a block diagram of an example, non-limiting system including input vectors that facilitates few-shot temporal action localization via graph convolutional networks in accordance with one or more embodiments described herein.

FIG. 6 illustrates a block diagram of an example, nonlimiting system 600 including input vectors that can facilitate few-shot temporal action localization via graph convolutional networks in accordance with one or more embodiments described herein. As shown, the system 600 can, in various embodiments, comprise the same components as the system 400, and can further comprise input vectors 602.

As explained above, in various embodiments, the instantiation component 118 can generate input vectors 602 based on the proposed feature vector 302 and/or based on the example feature vectors 202. In various instances, the input vectors 602 can include concatenations that respectively correspond to the nodes of the graph 402 (e.g., N concatenations corresponding to N nodes in the graph 402, which can correspond to N temporal action classifications in the support video set 104). Specifically, each vector of the input vectors 602 can be a concatenation of the proposed feature vector 302 and a respective vector of the example feature vectors 202 (e.g., concatenation 1 can be a concatenation of the proposed feature vector 302 with vector 1, concatenation 2 can be a concatenation of the proposed feature vector 302 with vector 2, . . . , concatenation N can be a concatenation of the proposed feature vector 302 with vector N, and so on). In various cases, vector concatenation can be performed by linking one end of the proposed feature vector 302 to one end of a respective vector from the example feature vectors 202. Thus, if the proposed feature vector 302 is a p-dimensional vector for some positive integer p and the example feature vectors 202 are also p-dimensional vectors, the input vectors 602 can be 2p-dimensional vectors. In some cases, the proposed feature vector 302 can be listed first in the concatenations (e.g., the first p elements in each of the input vectors 602 can come from the proposed feature vector 302). In some cases, the proposed feature vector 302 can be listed last in the concatenations (e.g., the last p elements in each of the input vectors 602 can come from the proposed feature vector 302). In various aspects, the instantiation component 118 can instantiate (e.g. input) each of the input vectors 602 into respective nodes of the graph 402 (e.g., node 1 can be instantiated with concatenation 1, node 2 can be instantiated with concatenation 2, . . . , node N can be instantiated with concatenation N, and so on). In various aspects, the input vectors 602 can be considered as initial and/or instantiated features/properties of the nodes of the graph 402 To continue the example above where the input video 106 is a gym membership commercial, the instantiation component 118 can input into the first node of the graph 402 the concatenation 1, can input into the second node of the graph 402 the concatenation 2, and can input into the third node of the graph 402 a concatenation 3 (not depicted in FIG. 6).

Figure 7:
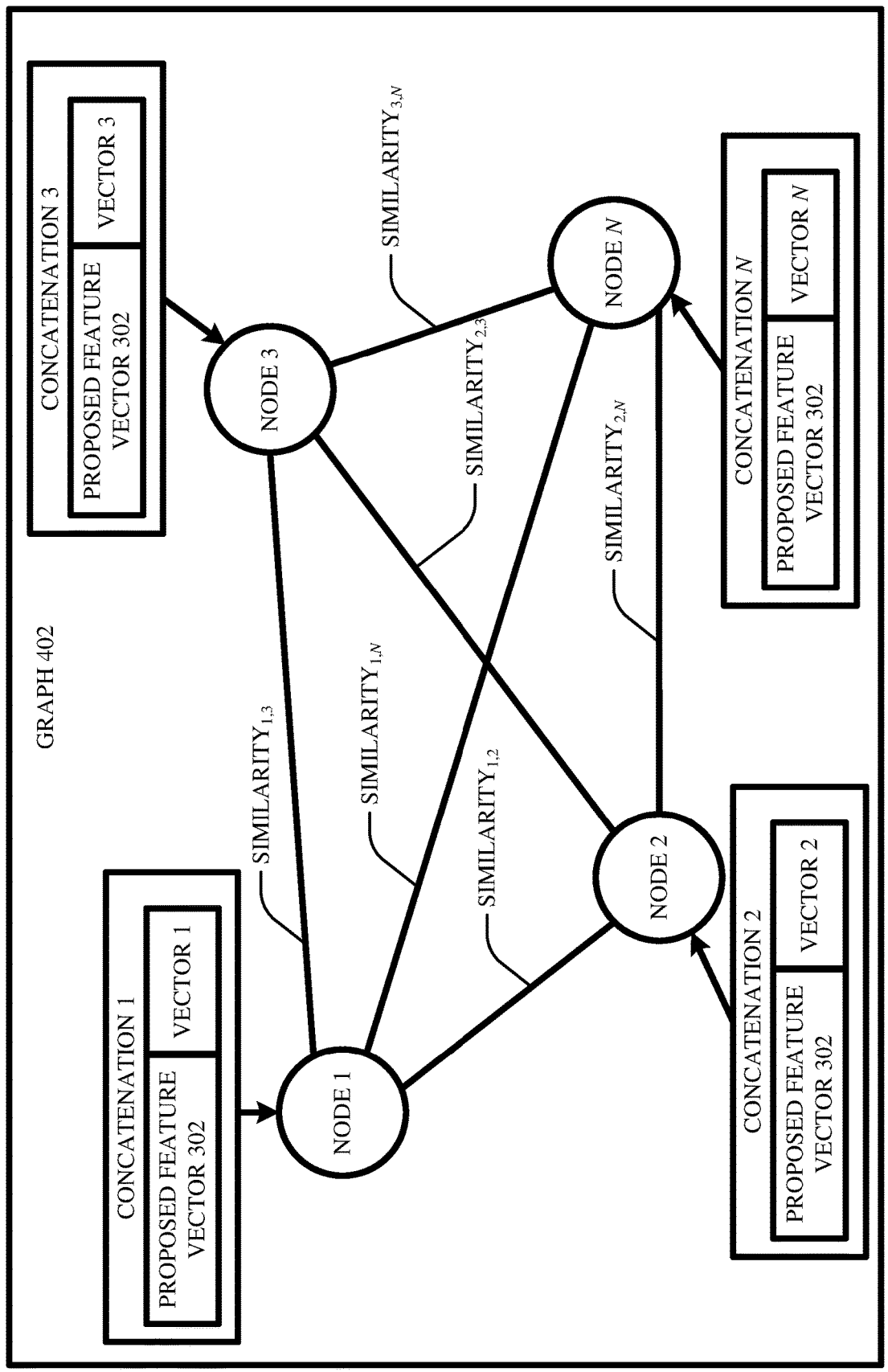
FIG. 7 illustrates a diagram of an example, non-limiting graph including input concatenations that facilitates few-shot temporal action localization via graph convolutional networks in accordance with one or more embodiments described herein.

FIG. 7 illustrates a diagram 700 of an example, nonlimiting graph including input concatenations that can facilitate few-shot temporal action localization via graph convolutional networks in accordance with one or more embodiments described herein.

In various embodiments, the diagram 700 can be a more detailed illustration of the graph 402 generated by the graph component 116 and instantiated by the instantiation component 118. As shown, node 1 of the graph 402 can receive as input (e.g., as an initial and/or instantiated feature/property) the concatenation 1 generated by the instantiation component 118. As shown, the concatenation 1 can be formed by linking the proposed feature vector 302 end-to-end with vector 1 from the example feature vectors 202. In the embodiment shown in FIG. 7, the proposed feature vector 302 can be listed first in the concatenation 1 (e.g., if the concatenation 1 includes 2p elements, the first p elements of the concatenation 1 can be the elements of the proposed feature vector 302, and the last p elements of the concatenation 1 can be the elements of vector 1 of the example feature vectors 202). In other embodiments, the proposed feature vector 302 can be listed last in the concatenation 1 (e.g., if the concatenation 1 includes 2p elements, the last p elements of the concatenation 1 can be the elements of the proposed feature vector 302, and the first p elements of the concatenation 1 can be the elements of vector 1 of the example feature vectors 202). In various embodiments, other ways of concatenating the proposed feature vector 302 with respective vectors of the example feature vectors 202 can be incorporated. As shown, just as with the concatenation 1, the concatenation 2 can comprise the proposed feature vector 302 and vector 2 of the example feature vectors 202 and can be inputted into node 2 of the graph 402, the concatenation 3 (not depicted in FIG. 6) can comprise the proposed feature vector 302 and vector 3 (not depicted in FIG. 6) of the example feature vectors 202 and can be inputted into node 3 of the graph 402, and the concatenation N can comprise the proposed feature vector 302 and vector N of the example feature vectors 202 and can be inputted into node N of the graph 402.

Figure 8:
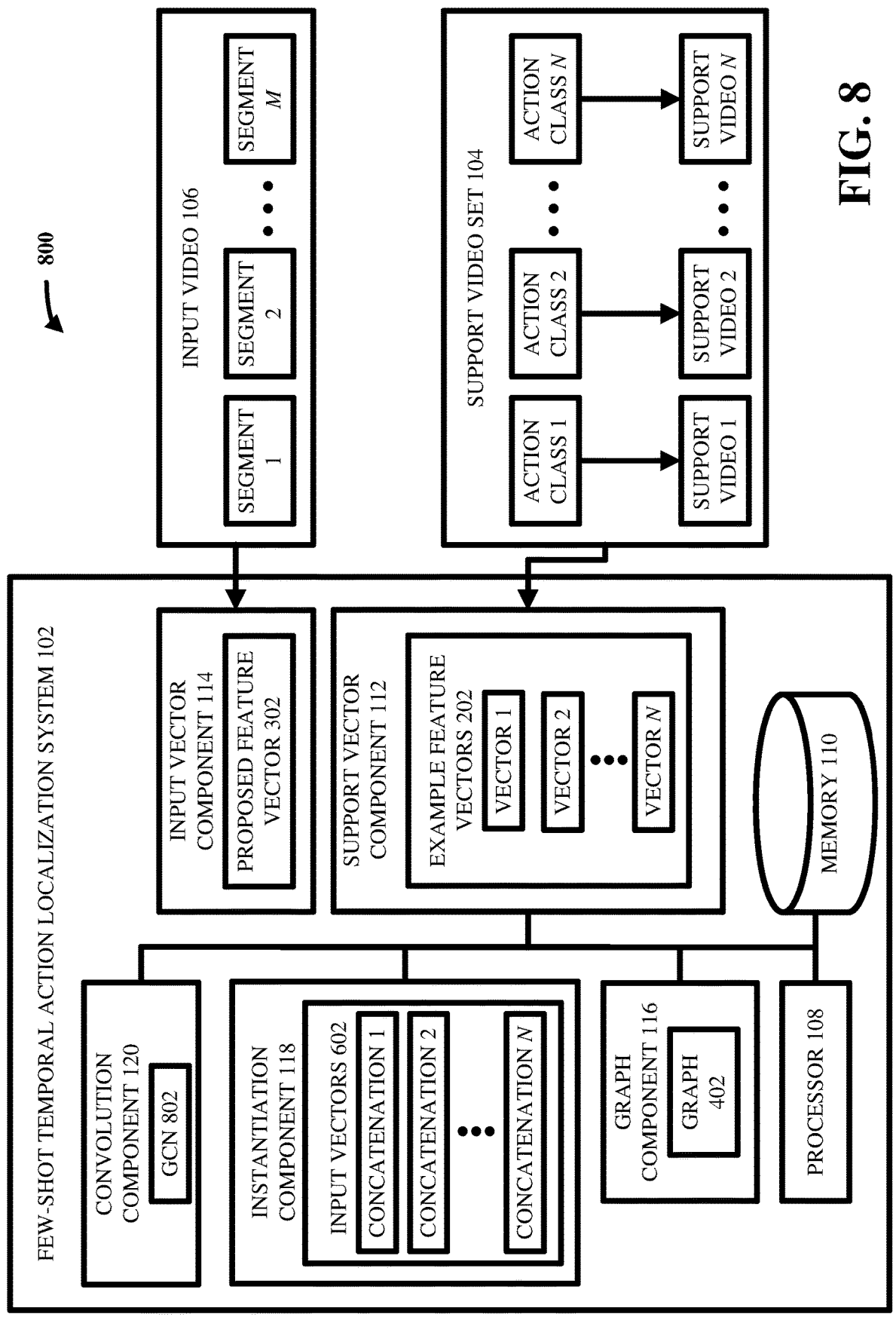
FIG. 8 illustrates a block diagram of an example, non-limiting system including a graph convolutional network that facilitates few-shot temporal action localization via graph convolutional networks in accordance with one or more embodiments described herein.

FIG. 8 illustrates a block diagram of an example, non-limiting system 800 including a graph convolutional network that can facilitate few-shot temporal action localization via graph convolutional networks in accordance with one or more embodiments described herein. As shown, the system 800 can, in various embodiments, comprise the same components as the system 600, and can further comprise a GCN 802, where "GCN" can stand for "graph convolutional network."

As explained above, in various embodiments, the convolution component 120 can, via the GCN 802, perform a convolution on the graph 402 generated by the graph component 116 and instantiated by the instantiation component 118. In one or more embodiments, the GCN 802 can be a graph convolutional network (e.g., a convolutional neural network that operates on structured and/or unstructured graphs) which can perform one or more convolutions on the graph 402. Graph convolutions (e.g., spectral-based, spatial-based, and so on) are mathematical operations performed by convolutional neural networks, where a function is learned by the convolutional neural network, such that the function takes as input a graph with a feature/property description for each node and produces a node-level output. In various embodiments, the GCN 802 can have any suitable/desired number of hidden layers and/or any suitable/desired number of neurons. In various embodiments, any suitable/desired activation function can be employed by the GCN 802. In one or more instances, the GCN 802 can be trained (e.g., via supervised training, unsupervised training, reinforcement learning, and so on) to take as input the graph 402, as generated by the graph component 116 and instantiated by the instantiation component 118, and to produce a convolved graph where each node outputs a matching score indicating a level of match between the action to be classified and the temporal action classification associated with the node. In various embodiments, any suitable/desired technique of updating weight parameters of the GCN 802 can be implemented (e.g., backpropagation, and so on). In various aspects, the initial feature description of each node in the graph 402 can be the input vectors 602 (e.g., the initial feature description of node 1 of the graph 402 can be the concatenation 1 of the input vectors 602, the initial feature description of node 2 of the graph 402 can be the concatenation 2 of the input vectors 602, . . . , the initial feature description of node N of the graph 402 can be the concatenation N of the input vectors 602, and so on). In various aspects, the matching scores can be the node-level output produced by the GCN 802. In various embodiments, the action to be classified can be determined to belong to a temporal action classification having a highest matching score. In various embodiments, the matching score for each node can be a scalar value. Thus, in various embodiments, the GCN 802 can take as input the graph 402 where each node has a vectoral property/feature description (e.g., one of the input vectors 602) and can produce as output a convolved graph having a same number of nodes as the graph 402 where each node of the convolved graph has a scalar property/feature description (e.g., the matching score). Continuing the above example where the input video 106 is a gym membership commercial, the graph 402 can be convolved by the convolution component 120 via the GCN 802, and the nodes of the graph 402 after convolution can output matching scores, with the highest matching score being outputted by the second node of the graph 402 (e.g., the node corresponding to the climbing classification). Thus, the action to be classified (e.g., the video snippet of an athlete climbing a rock wall) can be determined to be an instance of a climbing action. Note that this classification/localization can be accomplished without having to train a machine learning algorithm on voluminous data depicting various examples of swimming, climbing, and lifting. Instead, a single example/exemplar for each temporal action classification can, in various embodiments, be sufficient.

In various embodiments, other machine learning and/or artificial intelligence techniques can be implemented. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute, and so on) of the present innovation, components of the present innovation can examine the entirety or a subset of the data to which it is granted access and can provide for reasoning about or determine states of the system, environment, and so on from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 9:
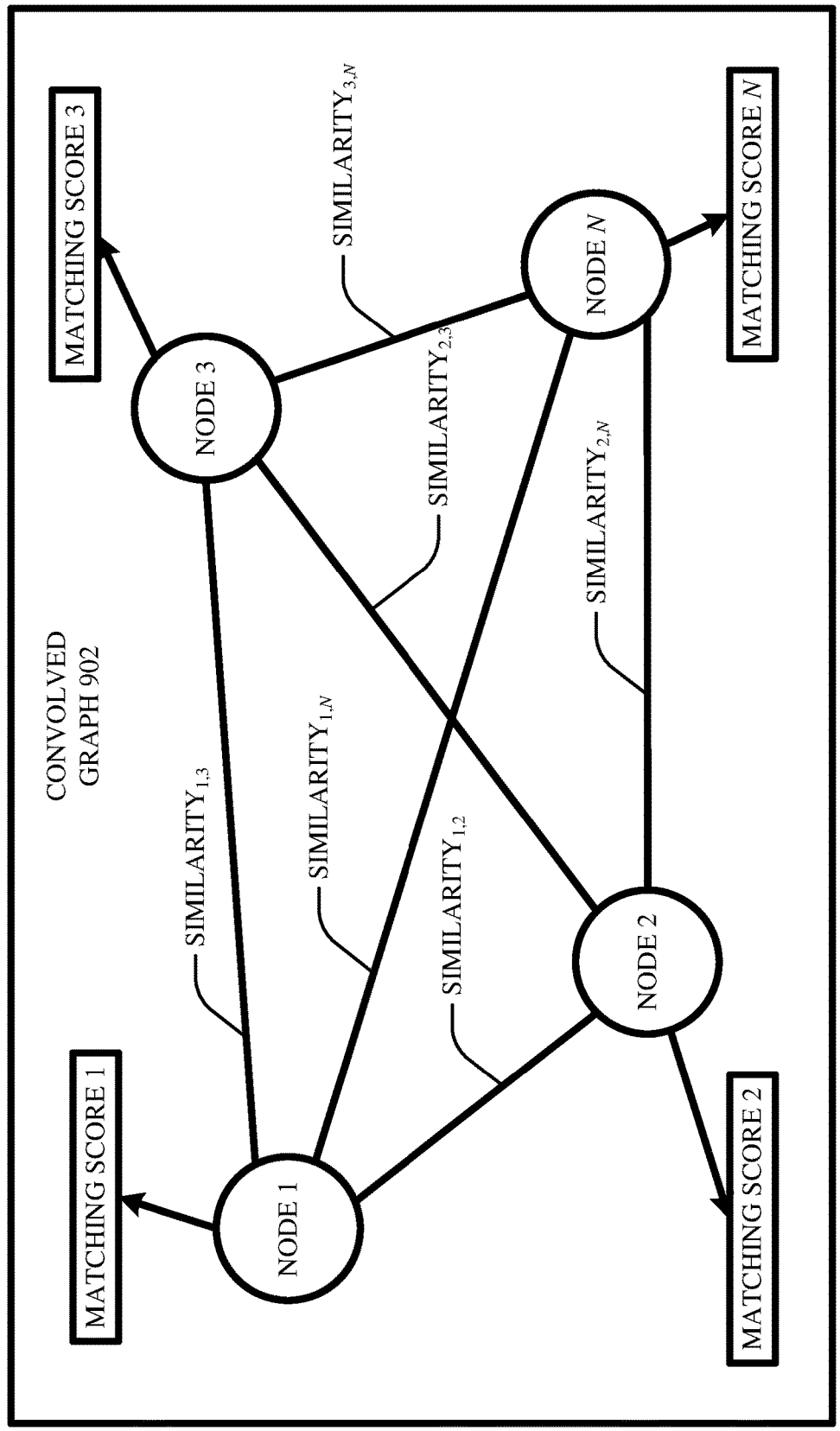
FIG. 9 illustrates a diagram of an example, non-limiting convolved graph that facilitates few-shot temporal action localization via graph convolutional networks in accordance with one or more embodiments described herein.

FIG. 9 illustrates a diagram 900 of an example, non-limiting convolved graph that can facilitate few-shot temporal action localization via graph convolutional networks in accordance with one or more embodiments described herein.

In various embodiments, the diagram 900 can be a more detailed illustration of a convolved graph 902 generated by the GCN 802 based on the graph 402. As shown, the convolved graph 902 can, in some embodiments have the same the number of nodes as the graph 402. In various embodiments, the convolved graph 902 can have the same edges and/or same edge weights as the graph 402. In some embodiments, the convolved graph 902 can have different edges and/or different edge weights than the graph 402. In various embodiments, each node of the convolved graph 902 can output a matching score (e.g., a scalar) that indicates a level of match between the action to be classified (e.g., represented by the proposed feature vector 302) and the temporal action classification corresponding to the node in question (e.g., represented by one of the example feature vectors 202). In various embodiments, the matching score of each node can be considered as the property/feature description of each node of the graph after convolution.

Figure 10:
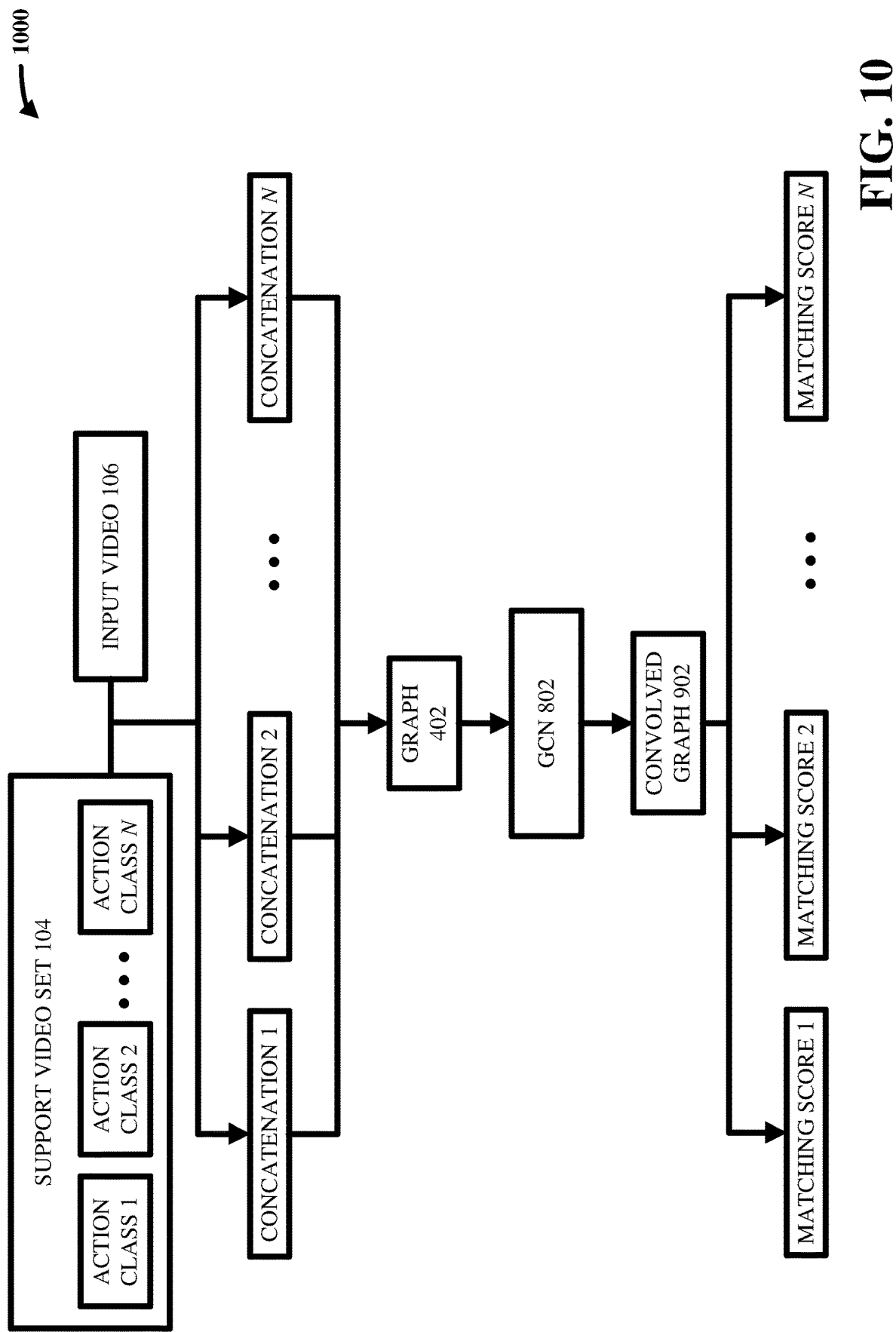
FIG. 10 illustrates a high-level block diagram of an example, non-limiting system that facilitates few-shot temporal action localization via graph convolutional networks in accordance with one or more embodiments described herein.

FIG. 10 illustrates a high-level block diagram of an example, non-limiting system 1000 that can facilitate few-shot temporal action localization via graph convolutional networks in accordance with one or more embodiments described herein.

In various aspects, FIG. 10 can depict a nonlimiting and exemplary summary of various embodiments of the subject claimed innovation. As shown and as described above, the input video 106 can depict an action to be classified. The support video set 104 can contain one or more one-shot support videos (e.g., support video 1, support video 2, ..., support video N) that depict examples/exemplars of respective temporal action classifications (e.g., action class 1, action class 2, ..., action class N). Vectors can be generated to represent the temporal action classifications (e.g., example feature vectors 202). Moreover, a vector can be generated to represent the action to be classified (e.g., the proposed feature vector 302). Based on these vectors representing the support video set 104 and the input video 106, a concatenation can be generated for each of the temporal action classifications (e.g., concatenation 1, concatenation 2, ..., concatenation N). As explained above, the graph 402 can be generated to model the support video set 104, having a separate node for each temporal action classification in the support video set 104, where edges of the graph 402 represent similarities between respective temporal action classifications. Respective nodes of the graph 402 can be instantiated with the respective concatenations. The graph 402 can then be inputted into the GCN 802 (e.g., convolutional neural network that operates on graphs) in order to perform a convolution on the graph 402, thereby yielding the convolved graph 902. Each node of the convolved graph 902 can have a scalar feature/property referred to as a matching score (e.g., matching score 1, matching score 2, ..., matching score N). In various instances, the action to be classified can be determined to belong to a temporal action classification that corresponds to a node with a highest matching score.

FIG. 11 illustrates a table 1100 of example, non-limiting results of few-shot temporal action localization via graph convolutional networks in accordance with one or more embodiments described herein.

Table 1100 depicts, for a particular data set, the mean average precision (mAP) of an embodiment of the subject claimed innovation (e.g., action localization by graph convolutional network) as compared to the mean average precision of a current state-of-the-art technique (e.g., action localization by learning sequence matching). As shown, the current state-of-the-art technique performed few-shot temporal action localization on a particular data set with a mean average precision of 13.6%. (See Yang, Hongtao, Xuming He, and Fatih Porikli: "One-Shot Action Localization by Learning Sequence Matching Network." *Proceedings of the IEEE Conference on Computer Vision and Pattern Recognition.* 2018). However, an embodiment of the subject claimed innovation performed few-shot temporal action localization on the same data set with a mean average precision of 15.3%. This is a significant improvement in efficacy of few-shot temporal action localization. As thoroughly explained above, various embodiments of the subject claimed innovation can remarkably outperform conventional techniques by quantifying and leveraging (e.g., via the graph 402 and the convolution component 120) the interrelationships among the temporal action classifications in the support set. Conventional techniques simply do not take into consideration how the action exemplars relate to each other; instead, they merely compare a proposed feature with each action exemplar independently. The inventors of the subject claimed innovation were the first to realize that significant accuracy/precision gains could be achieved by harnessing the interrelationships between the action classifications. Various embodiments of the subject claimed innovation accomplish this by modeling the support set via a particularly-structured graph (e.g., graph 402) and performing a convolution on the graph.

Figure 12:
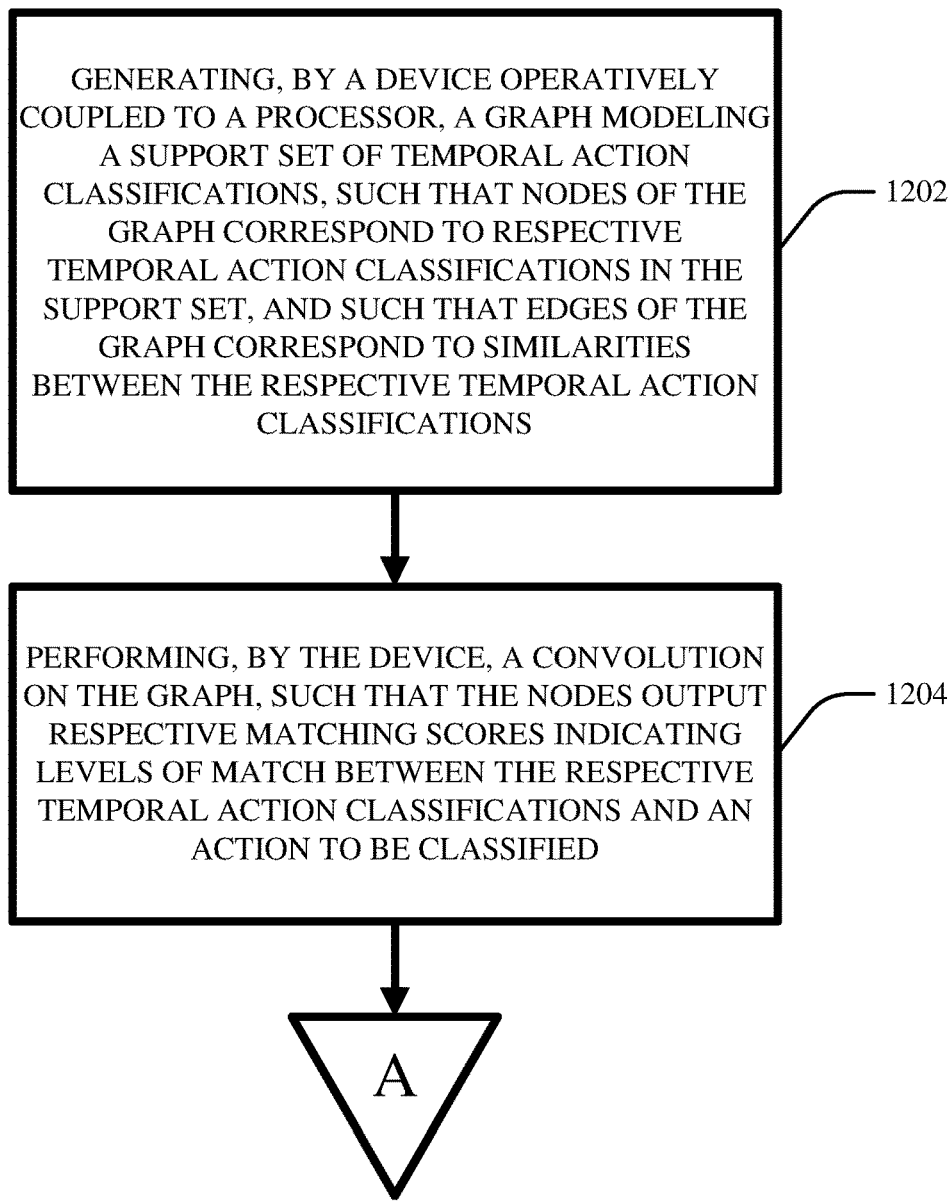
FIG. 12 illustrates a flow diagram of an example, non-limiting computer-implemented method that facilitates few-shot temporal action localization via graph convolutional networks in accordance with one or more embodiments described herein.

FIG. 12 illustrates a flow diagram of an example, non-limiting computer-implemented method 1200 that can facilitate few-shot temporal action localization via graph convolutional networks in accordance with one or more embodiments described herein.

In various aspects, act 1202 can include generating, by a device operatively coupled to a processor, a graph (e.g., graph 402) modeling a support set (e.g., support video set 104) of temporal action classifications (e.g., action class 1, action class 2, ..., action class N). In various embodiments, nodes (e.g., node 1, node 2, ..., node N) of the graph can correspond to respective temporal action classifications in the support set (e.g., node 1 can correspond to action class 1, node 2 can correspond to action class 2, ..., node N can correspond to action class N). In various embodiments, edges of the graph can correspond to similarities between the respective temporal action classifications (e.g., similarity$_{1,2}$ between node 1 and node 2 can represent a similarity between action class 1 and action class 2, similarity$_{2,N}$ between node 2 and node N can represent a similarity between action class 2 and action class N, and so on).

In various embodiments, act 1204 can include performing, by the device, a convolution (e.g., via convolution component 120 and/or GCN 802) on the graph, such that the nodes (e.g., nodes of the convolved graph 902) output respective matching scores (e.g., matching score 1, matching score 2, ..., matching score N) indicating levels of match between the respective temporal action classifications and an action to be classified (e.g., matching score 1 indicates level of match between the action to be classified and action class 1, matching score 2 indicates level of match between the action to be classified and action class 2, ..., matching score N indicates level of match between the action to be classified and the action class N).

Figure 13:
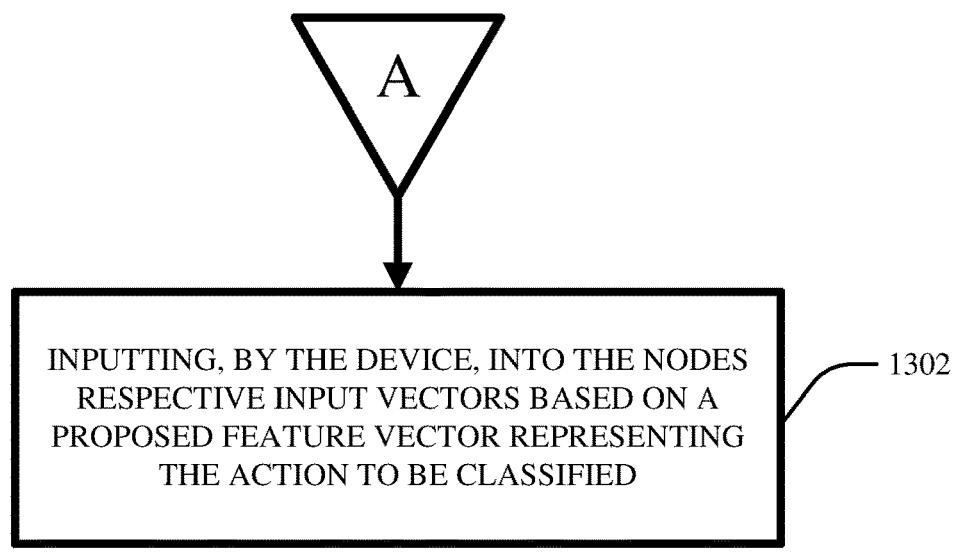
FIG. 13 illustrates a flow diagram of an example, non-limiting computer-implemented method including input vectors that facilitates few-shot temporal action localization via graph convolutional networks in accordance with one or more embodiments described herein.

FIG. 13 illustrates a flow diagram of an example, non-limiting computer-implemented method 1300 including input vectors that can facilitate few-shot temporal action localization via graph convolutional networks in accordance with one or more embodiments described herein. As shown, the computer-implemented method 1300 can, in various embodiments, comprise the same acts as the computer-implemented method 1200, and can further comprise act 1302.

In various instances, act 1302 can include inputting (e.g., via instantiation component 118), by the device, into the nodes respective input vectors (e.g., input vectors 602) based on a proposed feature vector (e.g., proposed feature vector 302) representing the action to be classified.

Figure 14:
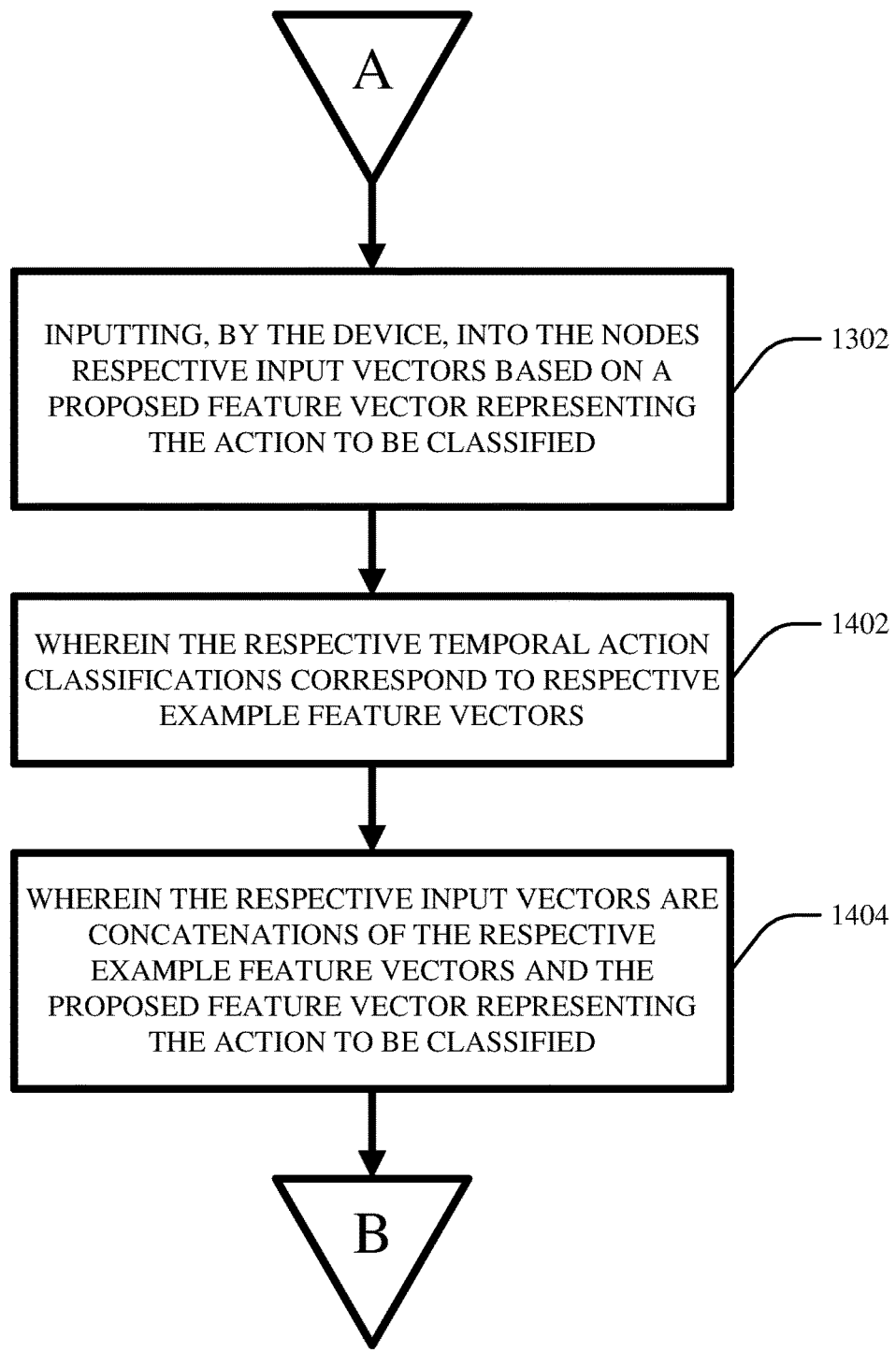
FIG. 14 illustrates a flow diagram of an example, non-limiting computer-implemented method including input concatenations that facilitates few-shot temporal action localization via graph convolutional networks in accordance with one or more embodiments described herein.

FIG. 14 illustrates a flow diagram of an example, non-limiting computer-implemented method 1400 including input concatenations that can facilitate few-shot temporal action localization via graph convolutional networks in accordance with one or more embodiments described herein. As shown, the computer-implemented method 1400 can, in various embodiments, comprise the same acts as the computer-implemented method 1300, and can further comprise act 1402 and act 1404.

In various aspects, act 1402 can comprise wherein the respective temporal action classifications correspond to respective example feature vectors (e.g., action class 1 can correspond to vector 1 of the example feature vectors 202, action class 2 can correspond to vector 2 of the example feature vectors 202, . . . , action class N can correspond to vector N of the example feature vectors 202).

In various embodiments, act 1404 can comprise wherein the respective input vectors are concatenations of the respective example feature vectors and the proposed feature vector representing the action to be classified (e.g., concatenation 1 can be a concatenation of the proposed feature vector 302 and vector 1 of the example feature vectors 202, concatenation 2 can be a concatenation of the proposed feature vector 302 and vector 2 of the example feature vectors 202, . . . , concatenation N can be a concatenation of the proposed feature vector 302 and vector N of the example feature vectors 202).

Figure 15:
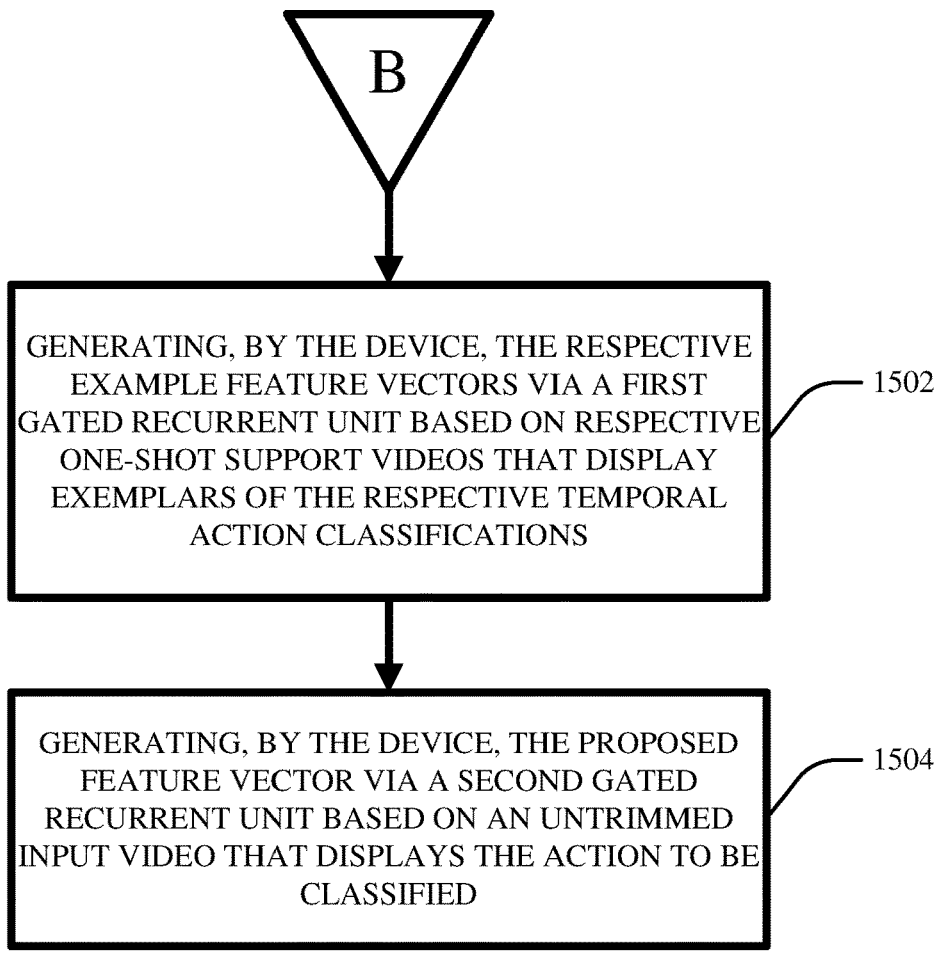
FIG. 15 illustrates a flow diagram of an example, non-limiting computer-implemented method including gated recurrent units that facilitates few-shot temporal action localization via graph convolutional networks in accordance with one or more embodiments described herein.

FIG. 15 illustrates a flow diagram of an example, non-limiting computer-implemented method 1500 including gated recurrent units that can facilitate few-shot temporal action localization via graph convolutional networks in accordance with one or more embodiments described herein. As shown, the computer-implemented method 1500 can, in various embodiments, comprise the same acts as the computer-implemented method 1400, and can further include act 1502 and act 1504.

In various instances, act 1502 can include generating, by the device, the respective example feature vectors via a first gated recurrent unit (e.g., employed by the support vector component 112) based on respective one-shot support videos (e.g., support video 1, support video 2, . . . , support video N) that display exemplars of the respective temporal action classifications.

In various aspects, act 1504 can include generating, by the device, the proposed feature vector via a second gated recurrent unit (e.g., employed by the input vector component 114) based on an untrimmed input video (e.g., input video 106) that displays the action to be classified.

Figure 16:
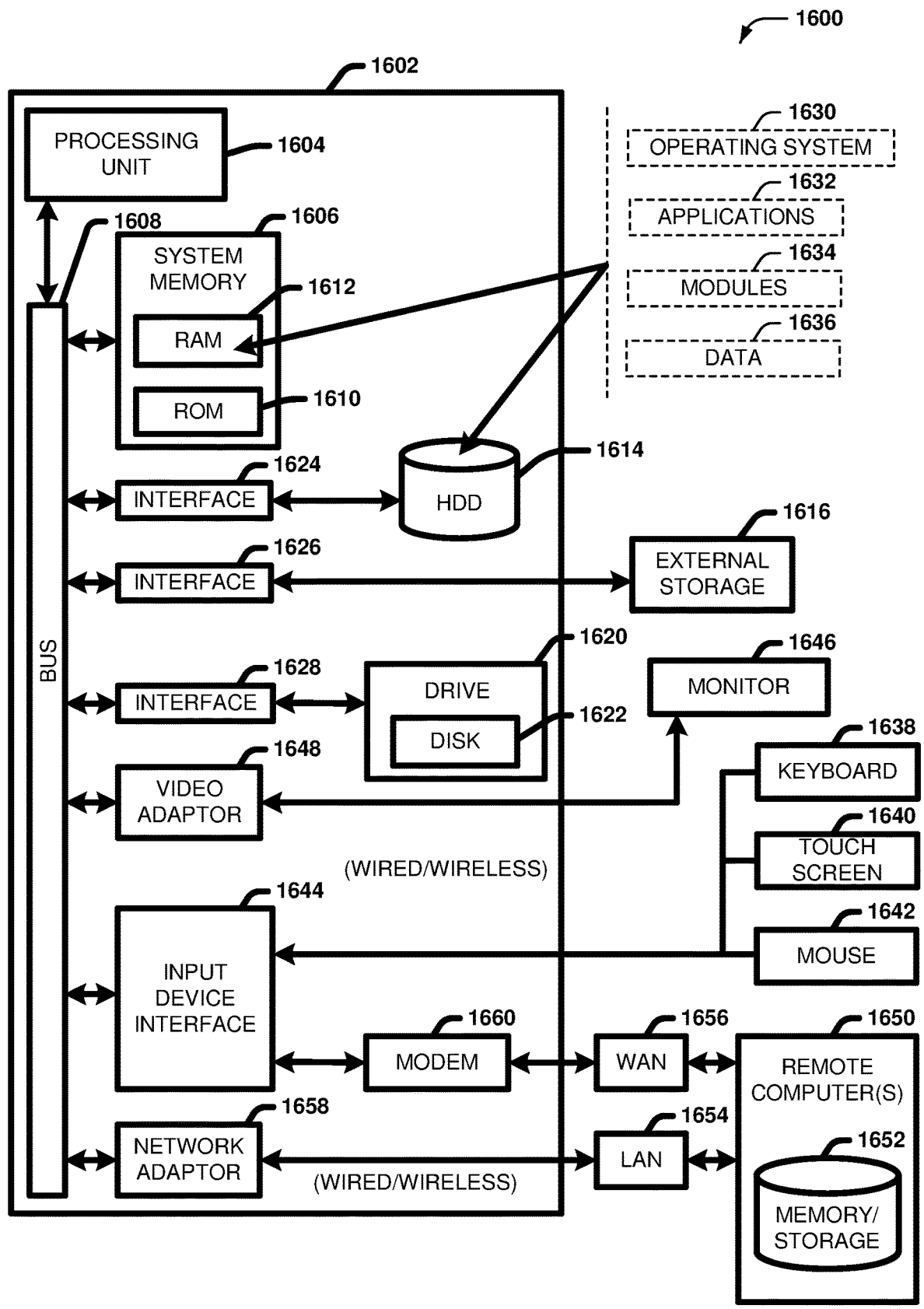
FIG. 16 illustrates a block diagram of an example, non-limiting operating environment in which one or more embodiments described herein can be facilitated.

In order to provide additional context for various embodiments described herein, FIG. 16 and the following discussion are intended to provide a general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and a drive 1620, e.g., such as a solid state drive, an optical disk drive, which can read or write from a disk 1622, such as a CD-ROM disc, a DVD, a BD, etc. Alternatively, where a solid state drive is involved, disk 1622 would not be included, unless separate. While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and drive 1620 can be connected to the system bus 1608 by an HDD interface 1624, an external storage interface 1626 and a drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/ wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/ storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above, such as but not limited to a network virtual machine providing one or more aspects of storage or processing of information. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor, operably coupled to the memory, that executes the computer-executable components stored in the memory, wherein the computer-executable components comprise:
      a graph component that generates a graph modeling a support set of temporal action classifications, such that nodes of the graph correspond to respective temporal action classifications in the support set, and such that edges of the graph correspond to similarities between the respective temporal action classifications; and
      a convolution component that performs a convolution on the graph, such that the nodes output respective matching scores indicating levels of match between the respective temporal action classifications and an action to be classified.

2. The system of claim 1, further comprising:
   an instantiation component that inputs into the nodes respective input vectors based on a proposed feature vector representing the action to be classified.

3. The system of claim 2, wherein
   the respective temporal action classifications correspond to respective example feature vectors; and
   the respective input vectors are concatenations of the respective example feature vectors and the proposed feature vector representing the action to be classified.

4. The system of claim 3, wherein:
   the respective example feature vectors are generated via a first gated recurrent unit based on respective one-shot support videos that display exemplars of the respective temporal action classifications; and
   the proposed feature vector is generated via a second gated recurrent unit based on an untrimmed input video that displays the action to be classified.

5. The system of claim 3, wherein the similarities are calculated based on cosine similarities between respective example feature vectors of respective temporal action classifications.

6. The system of claim 1, wherein the action to be classified is determined to belong to a temporal action classification having a highest matching score.

7. The system of claim 1, wherein the graph is an undirected graph.

8. A computer-implemented method, comprising:
   generating, by a device operatively coupled to a processor, a graph modeling a support set of temporal action classifications, such that nodes of the graph correspond to respective temporal action classifications in the support set, and such that edges of the graph correspond to similarities between the respective temporal action classifications; and
   performing, by the device, a convolution on the graph, such that the nodes output respective matching scores indicating levels of match between the respective temporal action classifications and an action to be classified.

9. The computer-implemented method of claim 8, further comprising:
inputting, by the device, into the nodes respective input vectors based on a proposed feature vector representing the action to be classified.

10. The computer-implemented method of claim 9, wherein
the respective temporal action classifications correspond to respective example feature vectors; and
the respective input vectors are concatenations of the respective example feature vectors and the proposed feature vector representing the action to be classified.

11. The computer-implemented method of claim 10, further comprising:
generating, by the device, the respective example feature vectors via a first gated recurrent unit based on respective one-shot support videos that display exemplars of the respective temporal action classifications; and
generating, by the device, the proposed feature vector via a second gated recurrent unit based on an untrimmed input video that displays the action to be classified.

12. The computer-implemented method of claim 10, wherein the similarities are calculated based on cosine similarities between respective example feature vectors of respective temporal action classifications.

13. The computer-implemented method of claim 8, wherein the action to be classified is determined to belong to a temporal action classification having a highest matching score.

14. The computer-implemented method of claim 8, wherein the graph is an undirected graph.

15. A computer program product for facilitating few-shot action localization, the computer program product comprising a computer readable storage medium having program instructions embodied therewith, the program instructions executable by a processing component to cause the processing component to:
generate a graph modeling a support set of temporal action classifications, such that nodes of the graph correspond to respective temporal action classifications in the support set, and such that edges of the graph correspond to similarities between the respective temporal action classifications; and
perform a convolution on the graph, such that the nodes output respective matching scores indicating levels of match between the respective temporal action classifications and an action to be classified.

16. The computer program product of claim 15, wherein the program instructions are further executable to cause the processing component to:
input into the nodes respective input vectors based on a proposed feature vector representing the action to be classified.

17. The computer program product of claim 16, wherein
the respective temporal action classifications correspond to respective example feature vectors; and
the respective input vectors are concatenations of the respective example feature vectors and the proposed feature vector representing the action to be classified.

18. The computer program product of claim 17, wherein the program instructions are further executable to cause the processing component to:
generate the respective example feature vectors via a first gated recurrent unit based on respective one-shot support videos that display exemplars of the respective temporal action classifications; and
generate the proposed feature vector via a second gated recurrent unit based on an untrimmed input video that displays the action to be classified.

19. The computer program product of claim 17, wherein the similarities are calculated based on cosine similarities between respective example feature vectors of respective temporal action classifications.

20. The computer program product of claim 15, wherein the action to be classified is determined to belong to a temporal action classification having a highest matching score.

* * * * *